United States Patent
Long et al.

(10) Patent No.: US 12,470,291 B2
(45) Date of Patent: Nov. 11, 2025

(54) FAULT DETECTION METHOD FOR OPTICAL SWITCHING APPARATUS, NETWORK DEVICE, AND SYSTEM

(71) Applicant: HUAWEI TECHNOLOGIES CO., LTD., Guangdong (CN)

(72) Inventors: Yun Long, Wuhan (CN); Zhiwen Chang, Dongguan (CN); Fan Ai, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 392 days.

(21) Appl. No.: 18/154,227

(22) Filed: Jan. 13, 2023

(65) Prior Publication Data
US 2023/0224033 A1 Jul. 13, 2023

Related U.S. Application Data

(63) Continuation of application No. PCT/CN2021/103947, filed on Jul. 1, 2021.

(30) Foreign Application Priority Data

Jul. 17, 2020 (CN) .......................... 202010692070.3

(51) Int. Cl.
*H04B 10/07* (2013.01)
*H04B 10/077* (2013.01)

(52) U.S. Cl.
CPC ..... *H04B 10/0771* (2013.01); *H04B 10/0777* (2013.01)

(58) Field of Classification Search
CPC ............ H04B 10/0771; H04B 10/0777; H04B 10/071; H04B 10/0791; H04Q 2011/0043;
(Continued)

(56) References Cited

U.S. PATENT DOCUMENTS 5,757,527 A * 5/1998 Mock ................. H04Q 11/0062
398/45
6,404,525 B1 * 6/2002 Shimomura ........... H04B 10/03
398/9
(Continued)

FOREIGN PATENT DOCUMENTS

| CN | 102122989 A | 7/2011 |
|----|-------------|--------|
| CN | 102291173 A | 12/2011 |

(Continued)

OTHER PUBLICATIONS

European Search Report for EP Application No. 21843391 dated Nov. 10, 2023, 10 pages.
(Continued)

*Primary Examiner* — Tanya T Motsinger

(57) ABSTRACT

The technology of this application relates to a fault detection method for an optical switching apparatus, a network device, and a system, to improve accuracy and efficiency of detecting whether the optical switching apparatus is faulty. The method includes sending a probe optical signal to a target path, where the probe optical signal is to be transmitted along the target path, and the target path includes at least one optical switching apparatus, receiving a plurality of reflected optical signals from the target path, where the plurality of reflected optical signals are formed after the probe optical signal is reflected by the target path, determining a target reflected optical signal in the plurality of reflected optical signals, where the target reflected optical signal is a reflected optical signal reflected by the optical switching apparatus, and determining, based on the target reflected optical signal, whether the optical switching apparatus is faulty.

20 Claims, 13 Drawing Sheets

(58) Field of Classification Search
CPC ....... H04Q 11/0005; H04Q 2213/1301; H04Q 11/0062; H04Q 2011/0083
See application file for complete search history.

(56) References Cited

U.S. PATENT DOCUMENTS

| | | | |
|---|---|---|---|
| 9,240,855 B1* | 1/2016 | Lam | G01M 11/3109 |
| 11,271,641 B1* | 3/2022 | Perron | G01M 11/3136 |
| 2003/0026524 A1* | 2/2003 | Kakizaki | G02B 6/3588 |
| | | | 385/16 |
| 2004/0208523 A1 | 10/2004 | Carrick et al. | |
| 2014/0098408 A1* | 4/2014 | Williams | G02F 3/026 |
| | | | 359/108 |
| 2014/0205279 A1* | 7/2014 | Lee | H04B 10/071 |
| | | | 398/21 |
| 2015/0022803 A1* | 1/2015 | Xia | G01M 11/3127 |
| | | | 356/73.1 |
| 2015/0229389 A1* | 8/2015 | Kim | H04B 10/073 |
| | | | 398/17 |
| 2016/0109327 A1* | 4/2016 | Viswanathan | G01M 11/3145 |
| | | | 356/73.1 |
| 2016/0277102 A1* | 9/2016 | Kim | H04B 10/0775 |
| 2017/0003177 A1* | 1/2017 | Cedilnik | G01K 11/32 |
| 2017/0338887 A1* | 11/2017 | Rao | H04J 14/0293 |
| 2019/0097719 A1 | 3/2019 | Chedore et al. | |
| 2019/0101419 A1* | 4/2019 | Rowen | H01S 3/302 |
| 2019/0238224 A1* | 8/2019 | Mansouri Rad | H04B 10/801 |
| 2019/0280767 A1* | 9/2019 | Haber | H04B 10/2537 |
| 2020/0191613 A1* | 6/2020 | Englund | G08B 13/1672 |
| 2021/0072483 A1* | 3/2021 | Kewitsch | G02B 6/356 |
| 2022/0247507 A1* | 8/2022 | Zhou | H04J 14/0258 |

FOREIGN PATENT DOCUMENTS

| | | |
|---|---|---|
| CN | 102571199 A | 7/2012 |
| JP | 2004248316 A | 9/2004 |
| WO | 2013097785 A1 | 7/2013 |
| WO | 2017206371 A1 | 12/2017 |

OTHER PUBLICATIONS

Office Action for Chinese Application No. 202010692070.3 dated Oct. 10, 2022, 6 pages.
PCT International Search Report for PCT/CN2021/103947 dated Jul. 1, 2021, 9 pages.

* cited by examiner

FAULT DETECTION METHOD FOR OPTICAL SWITCHING APPARATUS, NETWORK DEVICE, AND SYSTEM

CROSS-REFERENCE TO RELATED APPLICATION(S)

This application is a continuation of International Application No. PCT/CN2021/103947, filed on Jul. 1, 2021, which claims priority to Chinese Patent Application No. 202010692070.3, filed on Jul. 17, 2020. The disclosures of the aforementioned applications are hereby incorporated by reference in their entireties.

TECHNICAL FIELD

This application relates to the field of optical communication, and in particular, to a fault detection method for an optical switching apparatus, a network device, and a system.

BACKGROUND

With rapid development of big data technologies such as a 5th generation mobile communications technology (5G) and virtual reality (VR), data traffic in a network increases rapidly, and a transmission capacity in the network is increasingly large, especially a transmission capacity in an optical transport network. A network device configured to switch an optical signal in the optical transport network may include a plurality of source optical switching apparatuses and a plurality of sink optical switching apparatuses configured to switch an optical signal.

The optical signal is sequentially transmitted through the source optical switching apparatus, an optical fiber between the source optical switching apparatus and the sink optical switching apparatus, and the sink optical switching apparatus, to implement switching of a transmission direction of the optical signal. To detect whether the optical switching apparatus is faulty, an optical power at which the optical signal is transmitted to an input port in the source optical switching apparatus is detected, and an optical power at which the optical signal is transmitted to an output port in the sink optical switching apparatus is detected, and values of the two detected optical powers are compared to determine whether transmission of the optical signal is normal. If transmission of the optical signal is abnormal, it needs to be manually checked whether the source optical switching apparatus and the sink optical switching apparatus are faulty.

It may be learned that there is relatively low check efficiency and accuracy when fault check is manually performed on the optical switching apparatus.

SUMMARY

Embodiments of this application provide a fault detection method for an optical switching apparatus, a network device, and a system, to improve accuracy and efficiency of detecting whether the optical switching apparatus is faulty.

According to a first aspect, an embodiment of the present technology provides a fault detection method for an optical switching apparatus. The method includes: sending a probe optical signal to a target path, where the probe optical signal is to be transmitted along the target path, and the target path includes at least one optical switching apparatus; receiving a plurality of reflected optical signals from the target path, where the plurality of reflected optical signals are formed after the probe optical signal is reflected by the target path; determining a target reflected optical signal in the plurality of reflected optical signals, where the target reflected optical signal is a reflected optical signal reflected by the optical switching apparatus; and determining, based on the target reflected optical signal, whether the optical switching apparatus is faulty.

It may be learned that in the method provided in this aspect, it can be automatically detected whether the optical switching apparatus is faulty. No fault check needs to be manually performed on the optical switching apparatus, and whether the optical switching apparatus is faulty is detected based on the target reflected optical signal reflected by the optical switching apparatus. Therefore, efficiency and accuracy of detecting whether the optical switching apparatus is faulty are effectively improved.

Even if a large quantity of optical switching apparatuses are integrated into a network device, whether optical switching apparatuses on target paths are faulty can be detected by sending only different probe optical signals based on the optical switching apparatuses located on the different target paths. Therefore, the method shown in this aspect is applicable to a network device into which a large quantity of optical switching apparatuses are integrated. In the method shown in this embodiment, in a process of detecting the optical switching apparatus, there is strong robustness, and link noise can be effectively resisted.

Based on the first aspect, in an optional implementation, the target path further includes a probe unit, the probe unit is configured to send the probe optical signal to the target path, and the determining a target reflected optical signal in the plurality of reflected optical signals includes: obtaining a reflection spectrum, where the reflection spectrum includes a correspondence between an amplitude and a distance of any one of the plurality of reflected optical signals, and the distance of the any reflected optical signal is used to indicate a distance between a reflection point that is on the target path and that is configured to reflect the any reflected optical signal and the probe unit; and determining the target reflected optical signal in the reflection spectrum.

It may be learned that in the method shown in this aspect, a position of the target reflected optical signal reflected by the optical switching apparatus can be precisely determined based on the reflection spectrum. When the position of the target reflected optical signal is accurately determined, it can be accurately detected whether the optical switching apparatus is faulty. Therefore, accuracy of performing fault detection on the optical switching apparatus is improved.

Based on the first aspect, in an optional implementation, the at least one optical switching apparatus includes a first optical switching apparatus, an input port in the first optical switching apparatus is connected to an input optical fiber, an output port in the first optical switching apparatus is connected to an output optical fiber, and the determining the target reflected optical signal in the reflection spectrum includes: determining, in the reflection spectrum, a first reflected optical signal reflected by the input optical fiber; determining, in the reflection spectrum, a second reflected optical signal reflected by the output optical fiber; and determining, in the reflection spectrum, that a target reflected optical signal reflected by the first optical switching apparatus is located between the first reflected optical signal and the second reflected optical signal.

It may be learned that for the first optical switching apparatus, in the reflection spectrum shown in this aspect, the target reflected optical signal can be determined based on the first reflected optical signal reflected by the input optical fiber and the second reflected optical signal reflected by the output optical fiber. Therefore, precision of determining a position of the target reflected optical signal is effectively improved, and accuracy of performing fault detection on the first optical switching apparatus is improved.

Based on the first aspect, in an optional implementation, the at least one optical switching apparatus includes a second optical switching apparatus, an input port in the second optical switching apparatus is connected to an input optical fiber, transmission of the probe optical signal ends at an output port in the second optical switching apparatus, and the determining the target reflected optical signal in the reflection spectrum includes: determining, in the reflection spectrum, a first reflected optical signal reflected by the input optical fiber; and determining, in the reflection spectrum, that a target reflected optical signal reflected by the second optical switching apparatus is a reflected optical signal that corresponds to a distance that is greater than a distance corresponding to the first reflected optical signal.

It may be learned that for the second optical switching apparatus, in the reflection spectrum shown in this aspect, the target reflected optical signal can be determined based on the first reflected optical signal reflected by the input optical fiber. Therefore, precision of determining a position of the target reflected optical signal is effectively improved, and accuracy of performing fault detection on the second optical switching apparatus is improved.

Based on the first aspect, in an optional implementation, the determining, in the reflection spectrum, a first reflected optical signal reflected by the input optical fiber includes: determining a length of the input optical fiber; and determining, in the reflection spectrum, two reflected optical signals that meet a first condition, where an optical signal reflected by a first reflection point in the input optical fiber is the first reflected optical signal, the first reflection point is a reflection point that is included in the input optical fiber and that is at a shortest distance from the probe unit, and the first condition is that the two reflected optical signals are adjacent to each other in the reflection spectrum, and a distance between the two reflected optical signals corresponds to the length of the input optical fiber.

It may be learned that in the method shown in this aspect, a correspondence between an identifier of an input optical fiber and a length of the input optical fiber may be predetermined, and when the input optical fiber needs to be located in the reflection spectrum, the length of the input optical fiber is determined based on the predetermined correspondence, and the first reflected optical signal may be precisely determined in the reflection spectrum based on the length of the input optical fiber. In this way, efficiency and accuracy of locating the input optical fiber are improved.

Based on the first aspect, in an optional implementation, the determining, in the reflection spectrum, a second reflected optical signal reflected by the output optical fiber includes: determining a length of the output optical fiber; and determining, in the reflection spectrum, two reflected optical signals that meet a second condition, where an optical signal reflected by a second reflection point in the output optical fiber is the second reflected optical signal, the second reflection point is a reflection point that is included in the output optical fiber and that is at a longest distance from the probe unit, and the second condition is that the two reflected optical signals are adjacent to each other in the reflection spectrum, and a distance between the two reflected optical signals corresponds to the length of the output optical fiber.

It may be learned that in the method shown in this aspect, a correspondence between an identifier of an output optical fiber and a length of the output optical fiber may be predetermined, and when the output optical fiber needs to be located in the reflection spectrum, the length of the output optical fiber is determined based on the predetermined correspondence, and the second reflected optical signal may be precisely determined in the reflection spectrum based on the length of the output optical fiber. In this way, efficiency and accuracy of locating the output optical fiber are improved.

Based on the first aspect, in an optional implementation, the determining, based on the target reflected optical signal, whether the optical switching apparatus is faulty includes: obtaining a plurality of reflection spectra, where different reflection spectra are generated based on different probe optical signals; determining whether there is a target reflected optical signal that meets a fault condition, where the fault condition is that an absolute value of a difference between amplitudes corresponding to target reflected optical signals located at a same position in the plurality of reflection spectra is greater than or equal to a first preset value; and if there is a target reflected optical signal that meets the fault condition, determining that the optical switching apparatus is faulty.

It may be learned that in the method shown in this aspect, if any target reflected optical signal reflected by the optical switching apparatus does not meet the fault condition, it indicates that the optical switching apparatus is not faulty; or if one or more target reflected optical signals reflected by the optical switching apparatus meet the fault condition, it indicates that the optical switching apparatus is faulty. In the method shown in this aspect, whether the optical switching apparatus is faulty is detected for the plurality of reflection spectra. Therefore, a possibility of erroneous determining is avoided, and accuracy of detecting, based on the target reflected optical signal, whether the optical switching apparatus is faulty is further improved.

Based on the first aspect, in an optional implementation, the determining, based on the target reflected optical signal, whether the optical switching apparatus is faulty includes: determining whether there is a target reflected optical signal that meets a fault condition, where the fault condition is that an amplitude corresponding to the target reflected optical signal in the reflection spectrum is greater than or equal to a second preset value; and if there is a target reflected optical signal that meets the fault condition, determining that the optical switching apparatus is faulty.

It may be learned that in the method shown in this aspect, if any target reflected optical signal reflected by the optical switching apparatus does not meet the fault condition, it indicates that the optical switching apparatus is not faulty; or if one or more target reflected optical signals reflected by the optical switching apparatus meet the fault condition, it indicates that the optical switching apparatus is faulty. In the method shown in this aspect, whether the optical switching apparatus is faulty can be directly determined for one reflection spectrum. Therefore, efficiency of detecting whether the optical switching apparatus is faulty is improved.

Based on the first aspect, in an optional implementation, the method further includes: if it is determined that a position, in the reflection spectrum, of the target reflected optical signal that meets the fault condition corresponds to an input port in the optical switching apparatus, determining that the input port is faulty; and/or if it is determined that the position, in the reflection spectrum, of the target reflected optical signal that meets the fault condition corresponds to an output port in the optical switching apparatus, determining that the output port is faulty; and/or if it is determined that the position, in the reflection spectrum, of the target reflected optical signal that meets the fault condition is located between a position corresponding to the input port and a position corresponding to the output port, determining that an inside of the optical switching apparatus is faulty.

It may be learned that in the method shown in this aspect, a specific position, in the optical switching apparatus, at which a fault occurs can be directly determined. For example, whether the input port in the optical switching apparatus is faulty, whether the output port in the optical switching apparatus is faulty, or whether the inside of the optical switching apparatus is faulty can be directly determined based on the reflection spectrum. Therefore, a specific position, in the network device, at which a fault occurs is more precisely located, and efficiency and accuracy of maintaining the optical switching apparatus are improved.

Based on the first aspect, in an optional implementation, the target path further includes a photodiode (PD), the probe unit is located at a start position of the target path, the PD is located at an end position of the target path, and the method further includes: obtaining a first optical power at which the probe unit sends the probe optical signal; obtaining a second optical power of the probe optical signal received by the PD; and if a difference between the first optical power and the second optical power is greater than or equal to a third preset value, triggering execution of the step of determining a target reflected optical signal in the plurality of reflected optical signals.

It may be learned that in the method shown in this aspect, only when it is determined that the difference between the first optical power and the second optical power on the target path is greater than or equal to the third preset value, it indicates that an excessively large insertion loss is caused in transmission of the probe optical signal on the target path, and detection of whether each optical switching apparatus included on the target path is faulty is triggered. In this way, a disadvantage that fault detection is repeatedly performed when each optical switching apparatus included on the target path is in a normal state is avoided, and therefore efficiency of performing fault detection on the optical switching apparatus is improved.

Based on the first aspect, in an optional implementation, the method further includes: obtaining two second optical powers, where the two second optical powers are optical powers of two different probe optical signals received by the PD; and if it is determined that an absolute value of a difference between the two second optical powers is greater than or equal to a fourth preset value, triggering execution of the step of determining a target reflected optical signal in the plurality of reflected optical signals.

It may be learned that in the method shown in this aspect, only when it is determined that the absolute value of the difference between the two second optical powers on the target path is greater than or equal to the fourth preset value, it indicates that there is an excessively large difference between insertion losses respectively caused in transmission processes of the two probe optical signals on the target path, and detection of whether each optical switching apparatus included on the target path is faulty is triggered. In this way, a disadvantage that fault detection is repeatedly performed when each optical switching apparatus included on the target path is in a normal state is avoided, and therefore efficiency of performing fault detection on the optical switching apparatus is improved.

Based on the first aspect, in an optional implementation, the method further includes: if it is determined that there is at least one reflected optical signal that corresponds to an amplitude that is greater than or equal to a fifth preset value in the reflection spectrum, triggering execution of the step of determining a target reflected optical signal in the plurality of reflected optical signals.

It may be learned that in the method shown in this aspect, only when the network device determines that there are one or more reflected optical signals that correspond to amplitudes that are greater than or equal to the fifth preset value in the reflection spectrum on the target path, it indicates that there is an excessively large insertion loss on the target path, and further detection of whether each optical switching apparatus included on the target path is faulty is triggered. In this way, a disadvantage that fault detection is repeatedly performed when each optical switching apparatus included on the target path is in a normal state is avoided, and therefore efficiency of performing fault detection on the optical switching apparatus is improved.

Based on the first aspect, in an optional implementation, the method further includes: determining a largest distance value in the reflection spectrum, where the largest distance value is a largest value in distances between the plurality of reflected optical signals and the probe unit; and if it is determined that the largest distance value is less than a length of the target path, triggering execution of the step of determining a target reflected optical signal in the plurality of reflected optical signals.

It may be learned that in the method shown in this aspect, only when the network device determines that the largest distance value in the reflection spectrum is less than the length of the target path, it indicates that the probe optical signal cannot be transmitted to the end position of the target path, and detection of whether each optical switching apparatus included on the target path is faulty is triggered. In this way, a disadvantage that fault detection is repeatedly performed when each optical switching apparatus included on the target path is in a normal state is avoided, and therefore efficiency of performing fault detection on the optical switching apparatus is improved.

Based on the first aspect, in an optional implementation, the probe unit is an optical frequency domain reflectometer (OFDR), an optical time domain reflectometer (OTDR), or an optical coherence domain reflectometry (OCDR).

According to a second aspect, an embodiment of the present technology provides a network device. The network device includes: a sending module, configured to send a probe optical signal to a target path, where the probe optical signal is to be transmitted along the target path, and the target path includes at least one optical switching apparatus; a receiving module, configured to receive a plurality of reflected optical signals from the target path, where the plurality of reflected optical signals are formed after the probe optical signal is reflected by the target path; and a processing module, configured to determine a target reflected optical signal in the plurality of reflected optical signals, where the target reflected optical signal is a reflected optical signal reflected by the optical switching apparatus. The processing module is further configured to determine, based on the target reflected optical signal, whether the optical switching apparatus is faulty.

For description of beneficial effects shown in this aspect, refer to the first aspect.

Based on the second aspect, in an optional implementation, the target path further includes a probe unit, and the processing module is specifically configured to: obtain a reflection spectrum, where the reflection spectrum includes a correspondence between an amplitude and a distance of any one of the plurality of reflected optical signals, and the distance of the any reflected optical signal is used to indicate a distance between a reflection point that is on the target path and that is configured to reflect the any reflected optical signal and the probe unit; and determine the target reflected optical signal in the reflection spectrum.

Based on the second aspect, in an optional implementation, the at least one optical switching apparatus includes a first optical switching apparatus, an input port in the first optical switching apparatus is connected to an input optical fiber, an output port in the first optical switching apparatus is connected to an output optical fiber, and the processing module is specifically configured to: determine, in the reflection spectrum, a first reflected optical signal reflected by the input optical fiber; determine, in the reflection spectrum, a second reflected optical signal reflected by the output optical fiber; and determine, in the reflection spectrum, that a target reflected optical signal reflected by the first optical switching apparatus is located between the first reflected optical signal and the second reflected optical signal.

Based on the second aspect, in an optional implementation, the at least one optical switching apparatus includes a second optical switching apparatus, an input port in the second optical switching apparatus is connected to an input optical fiber, transmission of the probe optical signal ends at an output port in the second optical switching apparatus, and the processing module is specifically configured to: determine, in the reflection spectrum, a first reflected optical signal reflected by the input optical fiber; and determine, in the reflection spectrum, that a target reflected optical signal reflected by the second optical switching apparatus is a reflected optical signal that corresponds to a distance that is greater than a distance corresponding to the first reflected optical signal.

Based on the second aspect, in an optional implementation, the processing module is specifically configured to: determine a length of the input optical fiber; and determine, in the reflection spectrum, two reflected optical signals that meet a first condition, where a reflected optical signal reflected by a first reflection point in the input optical fiber is the first reflected optical signal, the first reflection point is a reflection point that is included in the input optical fiber and that is at a shortest distance from the probe unit, and the first condition is that the two reflected optical signals are adjacent to each other in the reflection spectrum, and a distance between the two reflected optical signals corresponds to the length of the input optical fiber.

Based on the second aspect, in an optional implementation, the processing module is specifically configured to: determine a length of the output optical fiber; and determine, in the reflection spectrum, two reflected optical signals that meet a second condition, where a reflected optical signal reflected by a second reflection point in the output optical fiber is the second reflected optical signal, the second reflection point is a reflection point that is included in the output optical fiber and that is at a longest distance from the probe unit, and the second condition is that the two reflected optical signals are adjacent to each other in the reflection spectrum, and a distance between the two reflected optical signals corresponds to the length of the output optical fiber.

Based on the second aspect, in an optional implementation, the processing module is specifically configured to: obtain a plurality of reflection spectra, where different reflection spectra are generated based on different probe optical signal; determine whether there is a target reflected optical signal that meets a fault condition, where the fault condition is that an absolute value of a difference between amplitudes corresponding to target reflected optical signals located at a same position in the plurality of reflection spectra is greater than or equal to a first preset value; and if there is a target reflected optical signal that meets the fault condition, determine that the optical switching apparatus is faulty.

Based on the second aspect, in an optional implementation, the processing module is specifically configured to: determine whether there is a target reflected optical signal that meets a fault condition, where the fault condition is that an amplitude corresponding to the target reflected optical signal in the reflection spectrum is greater than or equal to a second preset value; and if there is a target reflected optical signal that meets the fault condition, determine that the optical switching apparatus is faulty.

Based on the second aspect, in an optional implementation, the processing module is further configured to: if it is determined that a position, in the reflection spectrum, of the target reflected optical signal that meets the fault condition corresponds to an input port in the optical switching apparatus, determine that the input port is faulty; and/or if it is determined that the position, in the reflection spectrum, of the target reflected optical signal that meets the fault condition corresponds to an output port in the optical switching apparatus, determine that the output port is faulty; and/or if it is determined that the position, in the reflection spectrum, of the target reflected optical signal that meets the fault condition is located between a position corresponding to the input port and a position corresponding to the output port, determine that an inside of the optical switching apparatus is faulty.

Based on the second aspect, in an optional implementation, the target path further includes a photodiode (PD), the probe unit is located at a start position of the target path, the PD is located at an end position of the target path, and the processing module is further configured to: obtain a first optical power at which the probe unit sends the probe optical signal; obtain a second optical power of the probe optical signal received by the PD; and if a difference between the first optical power and the second optical power is greater than or equal to a third preset value, trigger the processing module to perform the step of determining a target reflected optical signal in the plurality of reflected optical signals.

Based on the second aspect, in an optional implementation, the processing module is further configured to: obtain two second optical powers, where the two second optical powers are optical powers of two different probe optical signals received by the PD; and if it is determined that an absolute value of a difference between the two second optical powers is greater than or equal to a fourth preset value, trigger the processing module to perform the step of determining a target reflected optical signal in the plurality of reflected optical signals.

Based on the second aspect, in an optional implementation, the processing module is further configured to: if it is determined that there is at least one reflected optical signal that corresponds to an amplitude that is greater than or equal to a fifth preset value in the reflection spectrum, trigger the processing module to perform the step of determining a target reflected optical signal in the plurality of reflected optical signals.

Based on the second aspect, in an optional implementation, the processing module is further configured to: determine a largest distance value in the reflection spectrum, where the largest distance value is a largest value in distances between the plurality of reflected optical signals and the probe unit; and if it is determined that the largest distance value is less than a length of the target path, trigger the processing module to perform the step of determining a target reflected optical signal in the plurality of reflected optical signals.

According to a third aspect, an embodiment of the present technology provides a network device. The network device includes a probe unit, a processor, and a memory. The processor is connected to the probe unit and the memory. The probe unit is directly connected to an optical switching apparatus included in the network device by using an optical fiber, or the probe unit is indirectly connected to an optical switching apparatus included in the network device by using an optical fiber and another optical switching apparatus.

The network device is configured to perform the method shown in the first aspect. For description of an execution process and beneficial effects, refer to the first aspect.

Based on the third aspect, in an optional implementation, the network device further includes a photodiode, the photodiode is connected to the processor, and the photodiode is configured to obtain a second optical power.

According to a fourth aspect, an embodiment of the present technology provides a network device. The network device includes a probe unit. The probe unit is directly connected to an optical switching apparatus included in the network device by using an optical fiber, or the probe unit is indirectly connected to an optical switching apparatus included in the network device by using an optical fiber and another optical switching apparatus.

Based on the fourth aspect, in an optional implementation, the network device further includes a photodiode, the photodiode is connected to the probe unit, and the photodiode is configured to obtain a second optical power.

According to a fifth aspect, an embodiment of the present technology provides a fault detection system. The fault detection system includes a target path. The target path includes a probe unit, and the target path further includes at least one optical switching apparatus. The probe unit is connected to one of the at least one optical switching apparatus by using an optical fiber.

The fault detection system is configured to perform the method shown in the first aspect. For description of an execution process and beneficial effects, refer to the first aspect.

Based on the fifth aspect, in an optional implementation, the target path further includes a photodiode (PD), the probe unit is located at a start position of the target path, and the PD is located at an end position of the target path.

According to a sixth aspect, an embodiment of the present technology provides a fault detection system. The fault detection system includes a target path, a processor, and a memory. The target path includes a probe unit, and the target path further includes at least one optical switching apparatus. The probe unit is connected to one of the at least one optical switching apparatus by using an optical fiber. The processor is connected to the memory and the probe unit.

The fault detection system is configured to perform the method shown in the first aspect. For description of an execution process and beneficial effects, refer to the first aspect.

Based on the sixth aspect, in an optional implementation, the target path further includes a photodiode PD, the probe unit is located at a start position of the target path, the PD is located at an end position of the target path, and the PD is connected to the processor.

According to a seventh aspect, an embodiment of the present technology provides a probe unit. The probe unit includes a transceiver, a processor, and a memory. The processor is connected to the transceiver and the memory.

According to an eighth aspect, an embodiment of the present technology provides a computer-readable storage medium, including instructions. When the instructions are run on a computer, the computer is enabled to perform the method shown in the first aspect.

According to a ninth aspect, an embodiment of the present technology provides a computer program product including instructions. When the computer program product is run on a computer, the computer is enabled to perform the method shown in the first aspect.

In the method shown in embodiments of the present technology, there is no need to manually check whether the optical switching apparatus is faulty, and the network device detects, by sending the probe optical signal to the target path, whether all optical switching apparatuses included on the target path are faulty. Therefore, efficiency and accuracy of performing fault detection on the optical switching apparatus are improved.

If a large quantity of optical switching apparatuses are integrated into the network device, whether optical switching apparatuses on target paths are faulty is detected by sending only different probe optical signals for the optical switching apparatuses located on the different target paths. Therefore, the method shown in embodiments of the present technology is applicable to a network device into which a large quantity of optical switching apparatuses are integrated. In the method shown in embodiments of the present technology, in a process of detecting the optical switching apparatus, there is strong robustness, and link noise can be effectively resisted.

In the method shown in embodiments of the present technology, a specific position, in the optical switching apparatus, at which a fault occurs can be directly determined. For example, whether the input port in the optical switching apparatus is faulty, whether the output port in the optical switching apparatus is faulty, or whether the inside of the optical switching apparatus is faulty can be directly determined based on the reflection spectrum. Therefore, a specific position, in the network device, at which a fault occurs is more precisely located, and efficiency and accuracy of maintaining the optical switching apparatus are improved.

Before fault detection is performed on each optical switching apparatus on the target path, whether a process of transmitting the probe optical signal on the target path meets a trigger condition is first determined by detecting the amplitude of the target reflected optical signal, the optical power of the probe optical signal, whether the probe optical signal can be successfully transmitted to the end position of the target path, or the like. If the process of transmitting the probe optical signal on the target path meets the trigger condition, detection of whether the optical switching apparatus included on the target path is faulty is triggered. In this way, a disadvantage that fault detection is repeatedly performed when each optical switching apparatus included on the target path is in a normal state is avoided, and therefore efficiency of performing fault detection on the optical switching apparatus is improved.

DESCRIPTION OF EMBODIMENTS

The following describes the technical solutions in embodiments of the present technology with reference to the accompanying drawings in embodiments of the present technology. The described embodiments are a part rather than all of embodiments of the present technology. All other embodiments obtained by a person of ordinary skill in the art based on embodiments of the present technology without creative efforts shall fall within the protection scope of the present technology.

Figure 1:
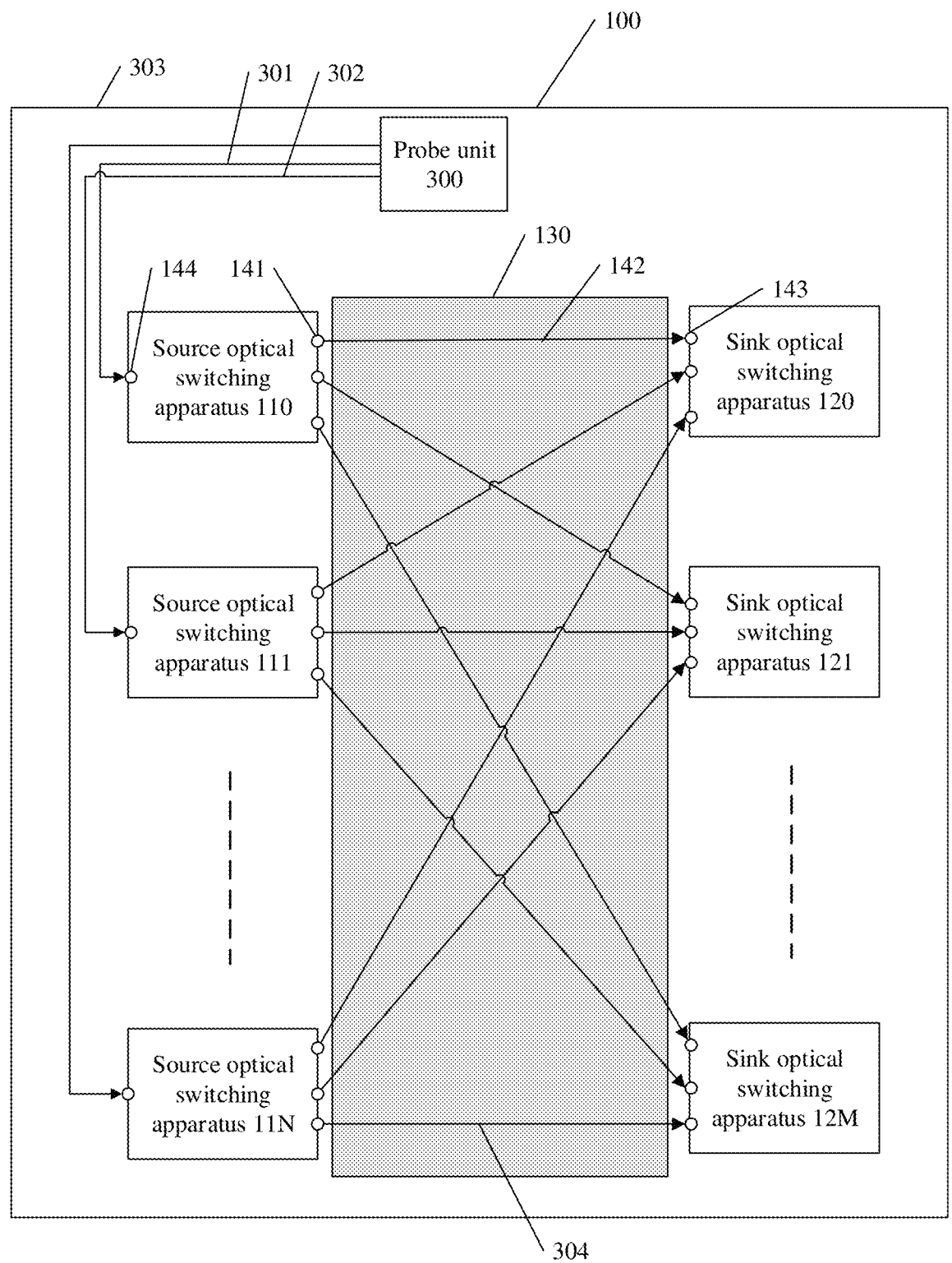
FIG. 1 is an example diagram of a structure of a first embodiment of a network device according to this application.

To better understand a detection method provided in this application, a structure of a network device to which the method shown in this application is applied is first described below with reference to FIG. 1. FIG. 1 is an example diagram of a structure of a first embodiment of a network device according to this application.

In this embodiment, a device type of the network device is not limited, provided that the network device can switch an optical signal in an optical transport network. For example, the network device may be an optical cross-connect (OXC) or a reconfigurable optical add/drop multiplexer (ROADM). In this embodiment, example description is provided by using an example in which the network device is an OXC.

As shown in FIG. 1, the network device 100 includes N source optical switching apparatuses (namely, source optical switching apparatuses 110 and 111 to 11N shown in FIG. 1). The network device 100 further includes M sink optical switching apparatuses (namely, sink optical switching apparatuses 120 and 121 to 12M shown in FIG. 1). In this embodiment, specific values of N and M are not limited, provided that both N and M are positive integers greater than or equal to 1. In this embodiment, example description is provided by using an example in which N is equal to 32 and M is equal to 32. It may be learned that the network device provided in this embodiment includes 32 source optical switching apparatuses and 32 sink optical switching apparatuses.

Specific device types of the source optical switching apparatus and the sink optical switching apparatus are not limited in this embodiment. For example, the source optical switching apparatus or the sink optical switching apparatus may be a liquid crystal on silicon (LCoS), a micro-electromechanical system (MEMS), a liquid crystal (LC), or a model crystal.

The network device 100 further includes an optical backplane (OB) 130 located between the source optical switching apparatus and the sink optical switching apparatus. The optical backplane 130 is a printed optical fiber board into which a large quantity of optical fibers are integrated. An output port configured to output an optical signal in the source optical switching apparatus is connected to an input port configured to receive an optical signal in the sink optical switching apparatus by using an optical fiber on the optical backplane 130. It should be clear that in this embodiment, example description is provided by using an example in which the source optical switching apparatus is connected to the sink optical switching apparatus by using the optical fiber printed on the OB. In another example, the OB 130 may not be disposed between the source optical switching apparatus and the sink optical switching apparatus, and the source optical switching apparatus may be directly connected to the sink optical switching apparatus by using an optical fiber.

In this embodiment, example description is provided by using an example in which there are two optical switching apparatuses configured to perform optical switching on an optical signal. For example, as shown in FIG. 1, an output port 141 in the source optical switching apparatus 110 is connected to an input port 143 in the sink optical switching apparatus 120 by using an optical fiber 142 on the optical backplane 130. When the source optical switching apparatus 110 needs to switch an optical signal to the sink optical switching apparatus 120, the source optical switching apparatus transmits, to the input port 143 by using the optical fiber 142, the optical signal output from the output port 141, to input the optical signal to the sink optical switching apparatus 120.

In another example, the network device may include one optical switching apparatus configured to perform optical switching on an optical signal. For example, the network device includes only the source optical switching apparatuses shown in FIG. 1. Alternatively, the network device may include at least two optical switching apparatuses configured to perform optical switching on an optical signal. For example, between the source optical switching apparatus and the sink optical switching apparatus, there are further one or more optical switching apparatuses connected by using an optical fiber.

Figure 2:
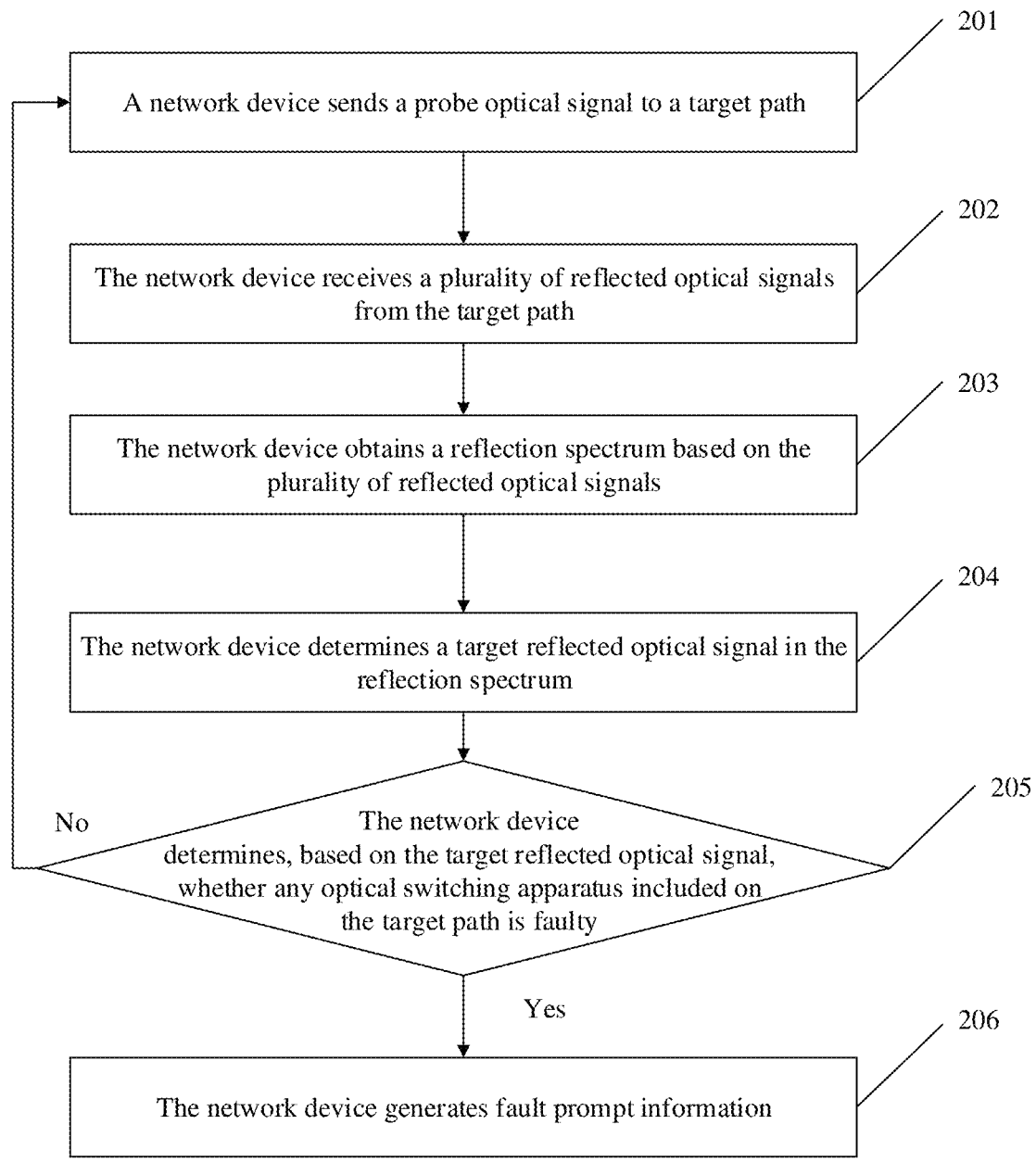
FIG. 2 is an example flowchart of steps of a first embodiment of a fault detection method for an optical switching apparatus according to this application.

An execution process of a fault detection method for an optical switching apparatus provided in this application is described below with reference to FIG. 2. FIG. 2 is a flowchart of steps of a first embodiment of a fault detection method according to this application.

In the method provided in this embodiment, it can be automatically detected whether the optical switching apparatus is faulty, and there is no need to manually perform fault check on the optical switching apparatus. Therefore, efficiency and accuracy of detecting whether the optical switching apparatus is faulty are effectively improved. A specific execution process is as follows:

Step 201: A network device sends a probe optical signal to a target path.

An execution body that performs step 201 is first described below.

The network device shown in this embodiment may send the probe optical signal to the target path by using a probe unit. A specific position of the probe unit is described with reference to FIG. 1.

As shown in FIG. 1, a probe unit 300 located in a network device 100 is connected to each source optical switching apparatus by using an optical fiber. For example, the probe unit 300 is connected to a source optical switching apparatus 110 by using a first optical fiber 301, the probe unit 300 is connected to a source optical switching apparatus 111 by using a first optical fiber 302, and the probe unit 300 is connected to a source optical switching apparatus 11N by using a first optical fiber 303.

It may be learned that the probe unit 300 may send a probe optical signal to each source optical switching apparatus by using the first optical fiber connected between the probe unit 300 and each source optical switching apparatus. For example, the probe unit 300 sends a probe optical signal to the source optical switching apparatus 110 by using the first optical fiber 301.

The probe unit may be an optical frequency domain reflectometer (OFDR), an optical time domain reflectometer (OTDR), or an optical coherence domain reflectometry (OCDR).

To effectively improve accuracy of detecting whether the optical switching apparatus is faulty and to avoid noise interference as much as possible, example description is provided in this embodiment by using an example in which the probe unit 300 is disposed in the network device. In another example, the probe unit 300 may alternatively be disposed outside the network device, provided that the probe unit 300 is connected to each source optical switching apparatus by using the first optical fiber.

The target path is described below.

The network device shown in this embodiment includes a plurality of paths used to perform optical switching on an optical signal, and different paths include different source optical switching apparatuses and different sink optical switching apparatuses. The optical signal is transmitted along different paths, to be switched to different sink optical switching apparatuses through optical switching.

As still shown in FIG. 1, a first path included in the network device includes the first optical fiber 301, the source optical switching apparatus 110, a second optical fiber 142, and a sink optical switching apparatus 120. That the optical signal is transmitted along the path means that the optical signal is sequentially transmitted through the first optical fiber 301, the source optical switching apparatus 110, the second optical fiber 142, and the sink optical switching apparatus 120. The second optical fiber 142 is an optical fiber connected between the source optical switching apparatus 110 and the sink optical switching apparatus 120. By analogy, an $N^{th}$ path included in the network device includes the first optical fiber 303, the source optical switching apparatus 11N, a second optical fiber 304, and a sink optical switching apparatus 12M. That the optical signal is transmitted along the path means that the optical signal is sequentially transmitted through the first optical fiber 303, the source optical switching apparatus 11N, the second optical fiber 304, and the sink optical switching apparatus 12M. The second optical fiber 304 is an optical fiber connected between the source optical switching apparatus 11N and the sink optical switching apparatus 12M.

It may be learned that the network device shown in this embodiment includes a plurality of paths, and the target path is a path used to perform fault detection in the plurality of paths. For example, if it is determined that it needs to be detected whether the optical switching apparatus included on the $N^{th}$ path shown above is faulty, the $N^{th}$ path may be determined as the target path.

How to determine the target path in the plurality of paths included in the network device is not limited in this embodiment. For example, the target path may be determined by polling the plurality of paths. Specifically, the network device includes the first path, a second path, . . . , and the $N^{th}$ path, and the network device determines each of the N paths as the target path.

For another example, the network device may randomly determine the target path in the plurality of paths. For another example, the network device may periodically determine each path as the target path.

Optionally, in this embodiment, a processor disposed in the network device may perform a process of determining the target path. When determining the target path, the processor may send target path indication information to the probe unit. The probe unit may determine, based on the target path indication information, the target path on which fault detection currently needs to be performed.

A specific device form of the processor is not limited in this embodiment. The processor may be one or more field-programmable gate arrays (FPGA), application-specific integrated circuits (ASIC), system on chips (SoC), central processor units (CPU), network processors (NP), digital signal processors (DSP), micro controller units (MCU), programmable logic devices (PLD), another integrated chip, or any combination of the foregoing chips or processors. Specifically, this is not limited in this embodiment. Alternatively, in this embodiment, the probe unit may determine the target path in the plurality of paths. This is not specifically limited in this embodiment.

In this embodiment, example description is provided by using an example in which the network device includes the probe unit and the processor. Optionally, the probe unit and the processor shown in this embodiment are located on a same board in the network device. Alternatively, the probe unit and the processor may be located on different boards in the network device. Alternatively, the probe unit may be disposed in the network device in a form of an independent physical module, and the probe unit is connected to a board on which the processor is located. In another example, the processor shown in this embodiment may alternatively be a processor in the probe unit.

A function of the probe unit is described below.

In this embodiment, when the probe unit determines the target path, the probe unit may send the probe optical signal to the target path. The probe optical signal is to be transmitted along the target path.

For example, if the target path is the $N^{th}$ path shown above, the probe optical signal sent by the probe unit can be sequentially transmitted through the first optical fiber 303, the source optical switching apparatus 11N, the second optical fiber 304, and the sink optical switching apparatus 12M.

In a process of transmitting the probe optical signal, the target path sends a reflected optical signal to the probe unit when the probe optical signal is transmitted to a reflection point. The reflection point refers to a position, on the target path, at which a refractive index changes. The reflection point shown in this embodiment may be at least one of the following positions:

a position at which the first optical fiber is connected to the probe unit, an input port that is included in the source optical switching apparatus and that is configured to be connected to the first optical fiber, a position, in the source optical switching apparatus, at which a refractive index changes, an output port that is included in the source optical switching apparatus and that is configured to be connected to a second optical fiber, a position that is included in a sink optical switching apparatus and at which a refractive index changes, and an input port that is included in the sink optical switching apparatus and that is configured to be connected to the second optical fiber.

The position that is included in the source optical switching apparatus and at which the refractive index changes may be a position at which an optical fiber included in the source optical switching apparatus is connected to each component included in the source optical switching apparatus, or may be a fault point in the source optical switching apparatus.

Specifically, the fault point in the source optical switching apparatus may be a position at which the optical fiber included in the source optical switching apparatus is faulty, a position at which the component included in the source optical switching apparatus is faulty, a position that is included in the source optical switching apparatus and at which there is an excessively large insertion loss, and/or the like.

For description of the position that is included in the sink optical switching apparatus and at which the refractive index changes, refer to the description of the position that is included in the source optical switching apparatus and at which the refractive index changes.

Optionally, interval duration between two consecutive probe optical signals sent by the probe unit needs to be greater than target duration. The target duration is total duration required for sending and receiving optical signals in a process of completing fault detection on the target path, that is, a timing start point of the target duration is a moment at which the probe optical signal is sent from the probe unit, and a timing end point of the target duration is a moment at which a last reflected optical signal reflected by the target path to the probe unit is received.

The interval duration between two consecutive probe optical signals that are sent is greater than the target duration. Therefore, a case in which when fault detection is performed on two target paths, optical signals respectively used to perform fault detection for two times overlap is effectively avoided, to ensure accuracy of performing fault detection on the optical switching apparatus included on the target path.

For example, the probe unit sequentially performs fault detection on the first path (namely, a path that includes the source optical switching apparatus 110 and the sink optical switching apparatus 120) and the $N^{th}$ path (namely, a path that includes the source optical switching apparatus 11N and the sink optical switching apparatus 12M) for two times. The probe unit sends a probe optical signal to the first path at a moment T0, and the probe unit sends another probe optical signal to the $N^{th}$ path at a moment T1. An interval between T0 and T1 is greater than or equal to the target duration. For the target duration, the moment T0 is used as the timing start point, and a moment at which the probe unit receives a last reflected optical signal reflected by the first path is used as the timing end point.

It may be learned that the interval between T0 and T1 is greater than or equal to the target duration. Therefore, the probe optical signal sent by the probe unit to the $N^{th}$ path and each reflected optical signal received from the $N^{th}$ path do not overlap optical signals sent and received in a process of detecting the first path by the probe unit. In this way, accuracy of detecting whether the optical switching apparatuses included on the first path and the $N^{th}$ path are faulty is effectively improved.

Step 202: The network device receives a plurality of reflected optical signals from the target path.

The network device shown in this embodiment may receive the plurality of reflected optical signals by using the probe unit. Specifically, the probe unit receives the plurality of reflected optical signals reflected from reflection points on the target path to the probe unit. For description of the reflection point, refer to step 201.

Step 203: The network device obtains a reflection spectrum based on the plurality of reflected optical signals.

In this embodiment, example description is provided by using an example in which the network device obtains the reflection spectrum by using the probe unit. That is, when obtaining the plurality of reflected optical signals, the probe unit may directly generate the reflection spectrum based on the plurality of reflected optical signals.

In another example, the network device may alternatively obtain the reflection spectrum by using the processor. Specifically, when receiving the plurality of reflected optical signals, the probe unit may convert the plurality of reflected optical signals into a plurality of reflected electrical signals, and send the reflected electrical signals to the processor, and the processor generates the reflection spectrum based on the plurality of reflected electrical signals.

Figure 3:
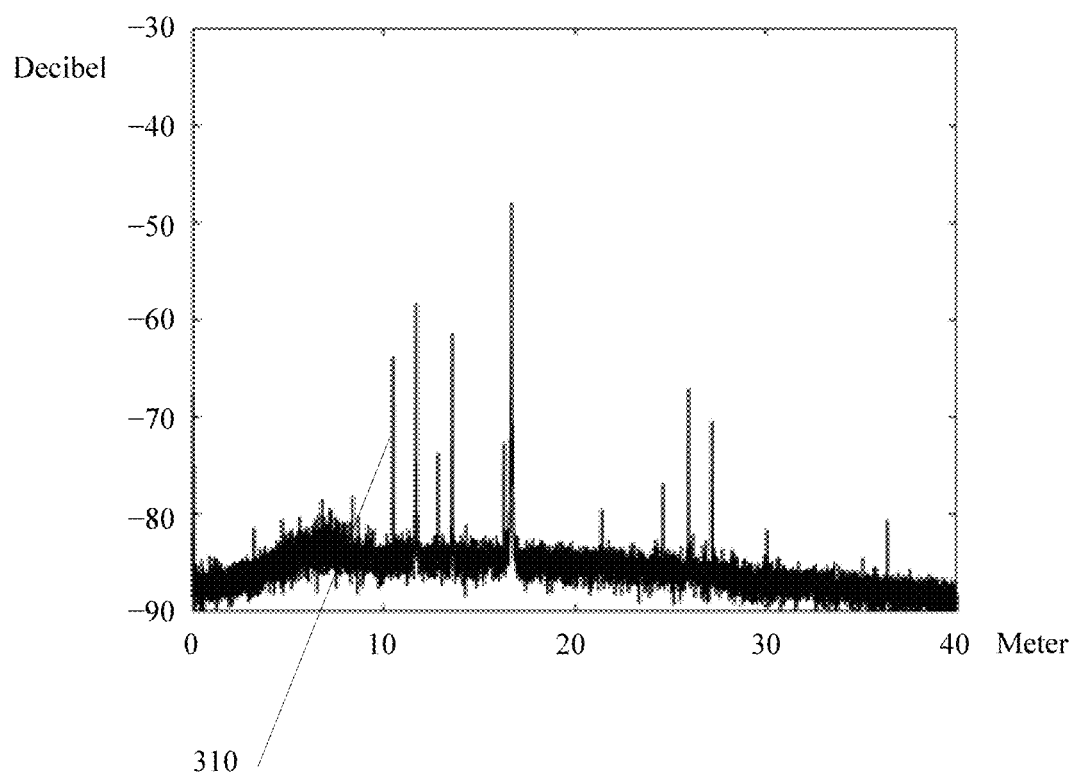
FIG. 3 is an example diagram of a first embodiment of a reflection spectrum according to this application.

The reflection spectrum shown in this embodiment is described below with reference to FIG. 3. FIG. 3 is an example diagram of a first embodiment of a reflection spectrum according to this application.

As shown in FIG. 3, the reflection spectrum is a two-dimensional coordinate system, and the two-dimensional coordinate system includes a plurality of reflection peaks. Each reflection peak represents a reflected optical signal. A horizontal coordinate in the two-dimensional coordinate system represents a distance between a reflection point that forms each reflected optical signal and the probe unit, and may be in a unit of meter (m).

Optionally, the probe unit may obtain the distance between the reflection point that forms each reflected optical signal and the probe unit based on a reflection measurement technology such as phase-sensitive optical time domain reflection (D-OTDR) or chaotic OTDR.

Specifically, the probe unit may calculate the physical distance between each reflection point configured to form each probe optical signal and the probe unit based on a time used for receiving each probe optical signal and a transmission speed of each probe optical signal on the target path, and then the probe unit converts the physical distance based on a preset ratio, and sets the physical distance in the reflection spectrum.

For example, a reflection point configured to form a reflected optical signal 310 is located at the input port that is included in the source optical switching apparatus and that is configured to be connected to the first optical fiber, and a distance between the reflection point configured to form the reflected optical signal 310 and the probe unit is 11 m. If the preset ratio is 1/500, the probe unit determines that the physical distance 11 m between the reflection point and the probe unit is represented by using a distance, namely, 11*1/500=2.2 centimeters, between a horizontal coordinate of the reflection point configured to form the reflected optical signal 310 and an origin.

A vertical coordinate in the reflection spectrum represents strength of each reflected optical signal. The strength of the reflected optical signal may represent a power or an amplitude of the reflected optical signal, and may be in a unit of decibel (dB).

It may be learned that a correspondence between an amplitude of any reflected optical signal and a distance between a reflection point configured to form the reflected optical signal and the probe unit is created in the reflection spectrum shown in this embodiment.

Step 204: The network device determines a target reflected optical signal in the reflection spectrum.

The target reflected optical signal shown in this embodiment is a reflected optical signal reflected by the source optical switching apparatus and a reflected optical signal reflected by the sink optical switching apparatus in the plurality of reflected optical signals included in the reflection spectrum. The network device may determine, based on a target reflected optical signal reflected by the source optical switching apparatus, whether the source optical switching apparatus is faulty, and further can determine, based on a target reflected optical signal reflected by the sink optical switching apparatus, whether the sink optical switching apparatus is faulty.

It may be learned that in the method shown in this embodiment, if it needs to be accurately determined whether the source optical switching apparatus and the sink optical switching apparatus are faulty, the target reflected optical signal reflected by the source optical switching apparatus and the target reflected optical signal reflected by the sink optical switching apparatus need to be precisely located in the reflection spectrum.

In this embodiment, example description is provided by using an example in which the network device determines the target reflected optical signal in the reflection spectrum by using the probe unit. In another example, the network device may alternatively determine the target reflected optical signal in the reflection spectrum by using the processor.

Several possible cases of obtaining the target reflected optical signal are described below.

Case 1

This case is applicable to a first optical switching apparatus included in the network device. An input port in the first optical switching apparatus is connected to an input optical fiber, and an output port in the first optical switching apparatus is connected to an output optical fiber. It may be learned that the first optical switching apparatus shown in this embodiment includes the input optical fiber configured to transmit the probe optical signal, and the probe optical signal is input to the first optical switching apparatus by using the input optical fiber. The first optical switching apparatus further includes the output optical fiber configured to transmit the probe optical signal, and the probe optical signal is output from the first optical switching apparatus by using the output optical fiber.

FIG. 1 is still used as an example. If the to-be-detected target path includes the source optical switching apparatus 110 and the sink optical switching apparatus 120, the first optical switching apparatus may be the source optical switching apparatus 110, the input optical fiber in the source optical switching apparatus 110 is the first optical fiber 301 connected between the source optical switching apparatus 110 and the probe unit 300, and the output optical fiber in the source optical switching apparatus 110 may be the second optical fiber 142 connected between the source optical switching apparatus 110 and the sink optical switching apparatus 120.

Figure 4:
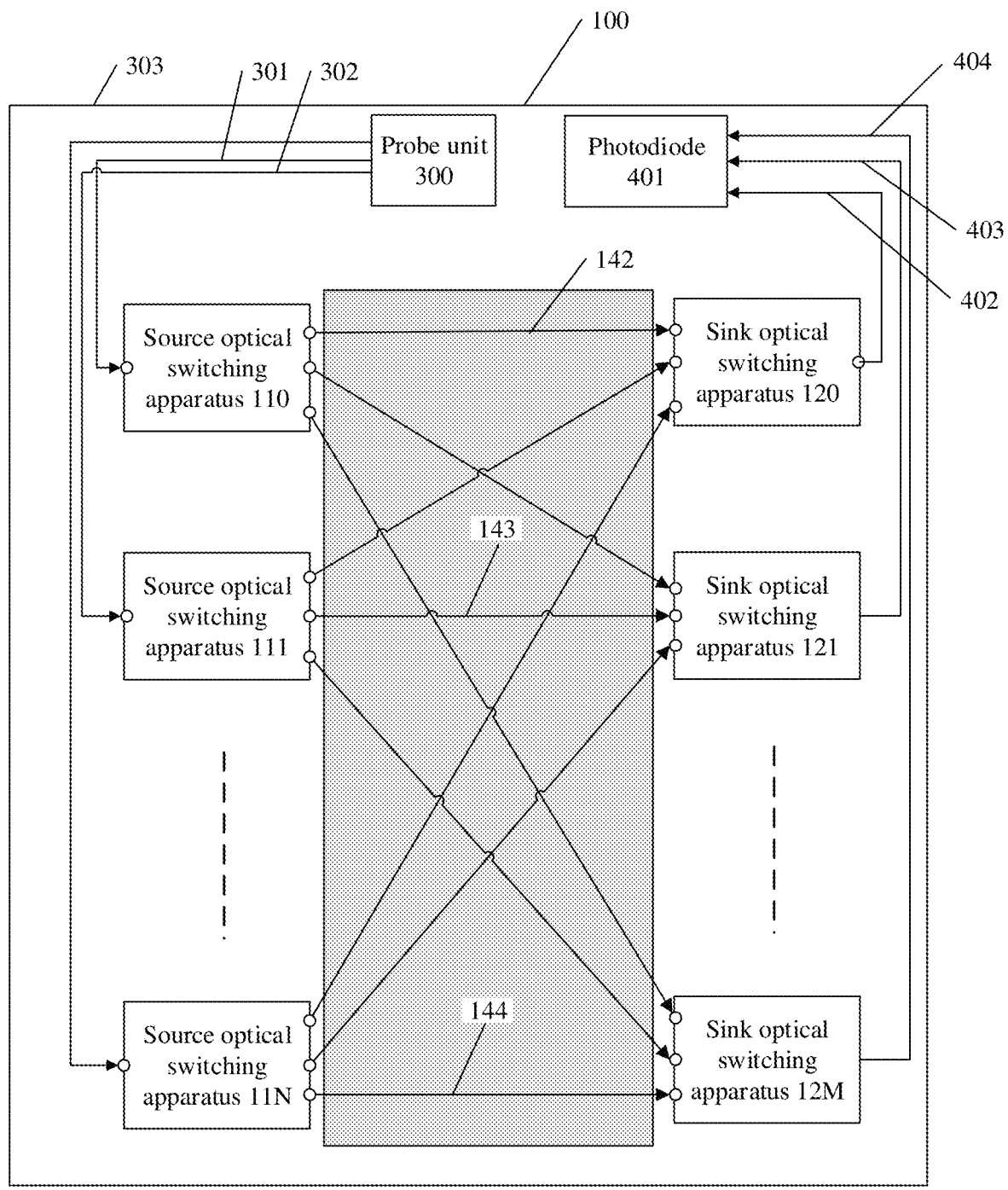
FIG. 4 is an example diagram of a structure of a second embodiment of a network device according to this application.

FIG. 4 is an example diagram of a structure of a second embodiment of a network device according to this application. The network device shown in FIG. 4 further includes a photodiode (PD) 401.

The PD 401 is connected to each sink optical switching apparatus by using a third optical fiber. That is, the PD 401 is connected to the sink optical switching apparatus 120 by using a third optical fiber 402, the PD 401 is connected to a sink optical switching apparatus 121 by using a third optical fiber 403, and by analogy, the PD 401 is connected to the sink optical switching apparatus 12M by using a third optical fiber 404.

An example in which the target path includes the source optical switching apparatus 110 and the sink optical switching apparatus 120 is still used. In this case, the first optical switching apparatus may alternatively be the sink optical switching apparatus 120 shown in FIG. 3, the input optical fiber in the sink optical switching apparatus 120 is the second optical fiber 142 connected between the sink optical switching apparatus 120 and the source optical switching apparatus 110, and the output optical fiber in the sink optical switching apparatus 120 is the third optical fiber 402 connected between the sink optical switching apparatus 120 and the PD 401.

How to determine, in the reflection spectrum, a target reflected optical signal reflected by the source optical switching apparatus 110 is described below by using an example in which the first optical switching apparatus is the source optical switching apparatus 110.

For a better understanding, general description is first described below.

The probe unit determines, in the reflection spectrum, a first reflected optical signal reflected by the first optical fiber 301;

the probe unit determines, in the reflection spectrum, a second reflected optical signal reflected by the second optical fiber 142; and the probe unit determines, in the reflection spectrum, that all reflected optical signals located between the first reflected optical signal and the second reflected optical signal are target reflected optical signals reflected by the source optical switching apparatus 110.

A process of how the probe unit determines the first reflected optical signal is described below.

First, the probe unit determines, in the reflection spectrum, two reflected optical signals reflected by the input optical fiber (namely, the first optical fiber 301) in the source optical switching apparatus 110.

Specifically, there are two reflection points at two ends of the first optical fiber 301. One reflection point in the first optical fiber 301 is connected to the probe unit, and the other reflection point in the first optical fiber 301 is connected to the input port in the first optical switching apparatus 110. Both the two reflection points in the first optical fiber 301 are positions at which a refractive index changes. Therefore, it may be learned that when receiving the probe optical signal, both the two reflection points in the first optical fiber 301 reflect the reflected optical signal to the probe unit.

To determine, in the reflection spectrum, the two reflected optical signals reflected by the first optical fiber 301, a preset correspondence needs to be prestored. The preset correspondence shown in this embodiment needs to store a correspondence between an identifier of each first optical fiber and a length of each first optical fiber.

The identifier of each first optical fiber is not limited in this embodiment, provided that the first optical fiber can be uniquely identified by using the identifier. For example, the identifier of the first optical fiber shown in this embodiment is a character. For example, a character "0010" identifies the first optical fiber 301, "0011" identifies the first optical fiber 302, and by analogy, "001N" identifies the first optical fiber 303.

It should be understood that the correspondence in this embodiment may be stored or recorded by using a function relationship, a table, a mapping relationship, or the like.

It should be clear that a quantity of identifiers of first optical fibers included in the preset correspondence is not limited in this embodiment, provided that the preset correspondence shown in this embodiment includes an identifier of a first optical fiber between the probe unit and any source optical switching apparatus, to detect whether the any source optical switching apparatus is faulty. The preset correspondence shown in this embodiment may be shown in Table 1:

TABLE 1

| Identifier of the first optical fiber | Length of the optical fiber |
|---|---|
| 0010 | 3 m |
| 0011 | 4 m |
| ... | ... |
| 0012 | 5 m |

In this embodiment, when the probe unit obtains the preset correspondence shown in Table 1, and the probe unit determines that the first optical fiber connected to the to-be-detected source optical switching apparatus 110 is the first optical fiber 301, it may be determined, by querying the preset correspondence, that a length of the first optical fiber 301 corresponding to the identifier "0010" of the first optical fiber 301 is 3 m.

The probe unit determines, in the reflection spectrum, that two reflected optical signals that meet a first condition are the reflected optical signals reflected by the first optical fiber 301. The first condition is that the two reflected optical signals are adjacent to each other in the reflection spectrum, and a distance between the two reflected optical signals corresponds to the length of the first optical fiber 301.

Figure 5:
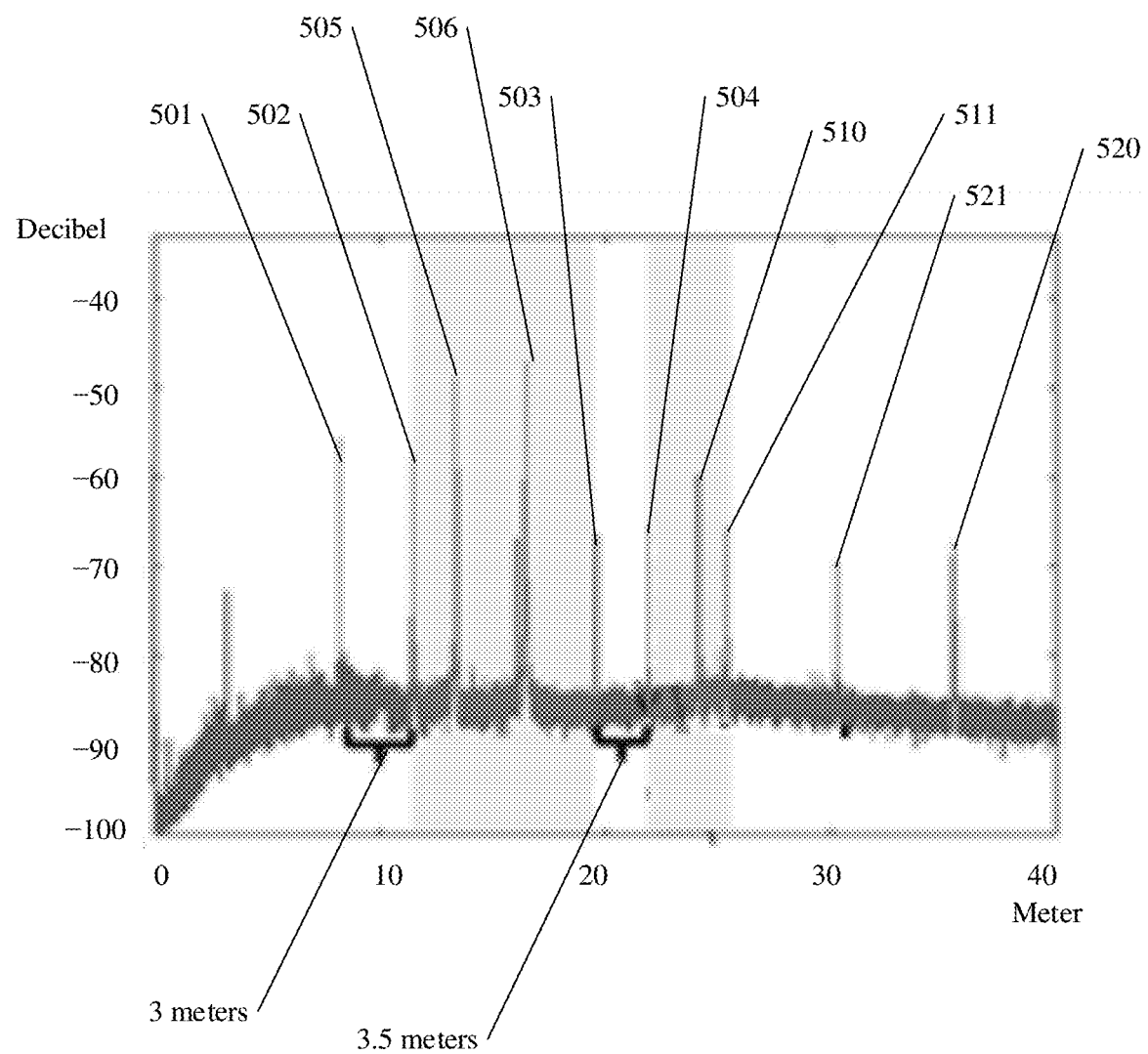
FIG. 5 is an example diagram of a second embodiment of a reflection spectrum according to this application.

Example description is provided below with reference to FIG. 5 and by using the source optical switching apparatus 110 as an example. FIG. 5 is an example diagram of a second embodiment of a reflection spectrum according to this application.

When obtaining that the length of the first optical fiber 301 in the source optical switching apparatus 110 is 3 m, the probe unit may determine, in the reflection spectrum, whether a corresponding distance between any two adjacent reflected optical signals is equal to 3 m.

If it is determined that a corresponding distance between a reflected optical signal 501 and a reflected optical signal 502 shown in FIG. 5 is equal to 3 m, it is determined that the two reflected optical signals (namely, the reflected optical signal 501 and reflected optical signal 502) are the two reflected optical signals reflected by the first optical fiber 301.

It may be understood that, that the reflected optical signal 501 and the reflected optical signal 502 are adjacent to each other specifically means that there is no other reflected optical signal (namely, reflection peak) between the reflected optical signal 501 and the reflected optical signal 502.

That a corresponding distance between a reflected optical signal 501 and a reflected optical signal 502 is equal to 3 m specifically means that a difference between a horizontal coordinate corresponding to the reflected optical signal 501 and a horizontal coordinate corresponding to the reflected optical signal 502 is equal to 3 m.

Then, when the probe unit determines the two reflected optical signals that meet the first condition, the probe unit determines the first reflected optical signal.

The first reflected optical signal is a reflected optical signal reflected by a first reflection point in the first optical fiber 301 in the two reflected optical signals that meet the first condition. The first reflection point is a reflection point that is included in the first optical fiber 301 and that is at a shortest distance from the probe unit.

It may be learned that in this example, the first reflection point in the first optical fiber 301 is a position at which the first optical fiber 301 is connected to the probe unit.

When the probe unit determines the first reflection point, it may be determined that a reflected optical signal reflected by the first reflection point is the first reflected optical signal.

For example, in the reflected optical signal 501 and the reflected optical signal 502 reflected by the first optical fiber 301, a corresponding distance between the reflected optical signal 501 and the probe unit is shorter than a corresponding distance between the reflected optical signal 502 and the probe unit. In other words, in the reflection spectrum, the horizontal coordinate corresponding to the reflected optical signal 501 is less than the horizontal coordinate corresponding to the reflected optical signal 502. Therefore, it may be learned that the reflected optical signal 501 is the first reflected optical signal reflected by the first reflection point.

A process of how the probe unit determines the second reflected optical signal is described below.

First, the probe unit determines, in the reflection spectrum, two reflected optical signals reflected by the output optical fiber (namely, the second optical fiber 142) in the source optical switching apparatus 110.

Specifically, there are two reflection points at two ends of the second optical fiber 142. One reflection point in the second optical fiber 142 is connected to the output port in the source optical switching apparatus 110, and the other reflection point in the second optical fiber 142 is connected to an input port in the sink optical switching apparatus 120. Both the two reflection points in the second optical fiber 142 are positions at which a refractive index changes. Therefore, it may be learned that when receiving the probe optical signal, both the two reflection points in the second optical fiber 142 reflect the reflected optical signal to the probe unit.

To determine, in the reflection spectrum, the two second reflected optical signals reflected by the second optical fiber 142, a preset correspondence needs to be prestored. The preset correspondence shown in this embodiment further stores a correspondence between an identifier of each second optical fiber and a length of each second optical fiber. For description of the identifier of the second optical fiber, refer to the description of the identifier of the first optical fiber.

For example, a character "0020" identifies the second optical fiber 142, "0021" identifies a second optical fiber 143, and by analogy, "002X" identifies a second optical fiber 144. As shown in FIG. 4, the second optical fiber 143 is connected between the source optical switching apparatus 111 and the sink optical switching apparatus 121, and the second optical fiber 144 is connected between the source optical switching apparatus 11N and the sink optical switching apparatus 12M.

It should be clear that a quantity of identifiers of second optical fibers included in the preset correspondence is not limited in this embodiment, provided that the preset correspondence shown in this embodiment includes an identifier of a second optical fiber between any source optical switching apparatus and any sink optical switching apparatus, to detect whether the any source optical switching apparatus and the any sink optical switching apparatus are faulty. The preset correspondence that is shown in this embodiment and that includes the identifier of the second optical fiber may be shown in Table 2:

TABLE 2

| Identifier of the second optical fiber | Length of the optical fiber |
|---|---|
| 0020 | 3.5 m |
| 0021 | 4.5 m |
| ... | ... |
| 002X | 5.5 m |

In this embodiment, when the probe unit obtains the preset correspondence shown in Table 2, and the probe unit determines that the second optical fiber connected to the to-be-detected source optical switching apparatus 110 is the second optical fiber 142, it may be determined, by querying the preset correspondence, that a length of the second optical fiber 142 corresponding to the identifier "0020" of the second optical fiber 142 is 3.5 m.

The probe unit determines, in the reflection spectrum, that two reflected optical signals that meet a second condition are the reflected optical signals reflected by the second optical fiber 142. The second condition is that the two reflected optical signals are adjacent to each other in the reflection spectrum, and a distance between the two reflected optical signals corresponds to the length of the second optical fiber 142.

Example description is provided below by using the source optical switching apparatus 110 as an example. When obtaining that the length of the second optical fiber 142 in the source optical switching apparatus 110 is 3.5 m, the probe unit may determine, in the reflection spectrum, whether a corresponding distance between any two adjacent reflected optical signals is equal to 3.5 m.

If it is determined that a corresponding distance between a reflected optical signal 503 and a reflected optical signal 504 shown in FIG. 5 is equal to 3.5 m, it is determined that the two reflected optical signals (namely, the reflected optical signal 503 and reflected optical signal 504) are the two reflected optical signals reflected by the second optical fiber 142.

It may be learned that the reflected optical signal 503 and the reflected optical signal 504 are adjacent to each other in the plurality of reflected optical signals included in the reflection spectrum, and a difference between a horizontal coordinate corresponding to the reflected optical signal 503 and a horizontal coordinate corresponding to the reflected optical signal 504 is equal to 3.5 m.

Then, when the probe unit determines the two reflected optical signals that meet the second condition, the probe unit determines the second reflected optical signal.

The second reflected optical signal is a reflected optical signal reflected by a second reflection point in the first optical fiber 301 in the two reflected optical signals that meet the second condition. The second reflection point is a reflection point that is included in the second optical fiber 142 and that is at a longest distance from the probe unit.

It may be learned that in this example, the second reflection point in the second optical fiber 142 is a position at which the second optical fiber 142 is connected to the input port in the sink optical switching apparatus 120.

When the probe unit determines the second reflection point, it may be determined that a reflected optical signal reflected by the second reflection point is the second reflected optical signal.

In the reflected optical signal 503 and the reflected optical signal 504 reflected by the second optical fiber 142, a corresponding distance between the reflected optical signal 503 and the probe unit is longer than a corresponding distance between the reflected optical signal 504 and the probe unit. Therefore, it may be learned that the reflected optical signal 504 is the second reflected optical signal reflected by the second reflection point.

A process in which the probe unit determines, in the reflection spectrum, the target reflected optical signal reflected by the source optical switching apparatus 110 is described below.

Specifically, the probe unit has determined the first reflected optical signal (namely, the reflected optical signal 501 in the foregoing example), and has further determined the second reflected optical signal (namely, the reflected optical signal 504 in the foregoing example) in the reflection spectrum. The probe unit may determine that the target reflected optical signal reflected by the source optical switching apparatus 110 is an optical signal located between the first reflected optical signal 501 and the second reflected optical signal 504.

Continuing to refer to the reflection spectrum shown in FIG. 5, it may be learned that target reflected optical signals reflected by the source optical switching apparatus 110 are reflected optical signals 502, 505, 506, and 503 located between the first reflected optical signal 501 and the second reflected optical signal 504.

Optionally, if the network device cannot determine, in the reflection spectrum in a process of detecting the source optical switching apparatus 110, the transmitted optical signal reflected by the first optical fiber 301 and/or the reflected optical signal reflected by the second optical fiber 142, the network device may directly perform step 206, to generate fault prompt information used to indicate an event indicating that the transmitted optical signal reflected by the first optical fiber 301 and/or the reflected optical signal reflected by the second optical fiber 142 cannot be determined.

For a process of how the network device determines, in the reflection spectrum, a target reflected optical signal reflected by the sink optical switching apparatus 120, refer to the process in which the target reflected optical signal reflected by the source optical switching apparatus 110 is determined in the reflection spectrum.

Case 2

In the case 1, the optical switching apparatus on which fault detection is to be performed includes the input optical fiber and the output optical fiber configured to transmit the probe optical signal. However, this case is applicable to a second optical switching apparatus included in the network device. The second optical switching apparatus includes only an input optical fiber configured to transmit the probe optical signal.

Specifically, the second optical switching apparatus shown in this case means that the probe optical signal is transmitted to an inside of the second optical switching apparatus by using the input optical fiber, and the probe optical signal is transmitted to an output port in the second optical switching apparatus after being transmitted through the inside of the second optical switching apparatus, and transmission of the probe optical signal ends at the output port in the second optical switching apparatus.

FIG. 1 is used as an example. If the to-be-detected target path includes the source optical switching apparatus 110 and the sink optical switching apparatus 120, the second optical switching apparatus is the sink optical switching apparatus 120, and the input optical fiber in the sink optical switching apparatus 120 is the second optical fiber 142 connected between an output port 141 in the source optical switching apparatus 110 and an input port 143 in the sink optical switching apparatus 120.

No optical fiber used to transmit the probe optical signal is disposed at the output port in the sink optical switching apparatus 120. It may be learned that transmission ends when the probe optical signal is transmitted to the output port in the sink optical switching apparatus 120. A process of how to determine, in the reflection spectrum, a target reflected optical signal reflected by the sink optical switching apparatus 120 is described below.

First, the probe unit determines, in the reflection spectrum, a first reflected optical signal reflected by the second optical fiber 142.

For a specific process in which the probe unit determines, in the reflection spectrum, the first reflected optical signal reflected by the sink optical switching apparatus 120, refer to the process in which the probe unit determines, in the reflection spectrum, the first reflected optical signal reflected by the source optical switching apparatus 110.

Figure 6:
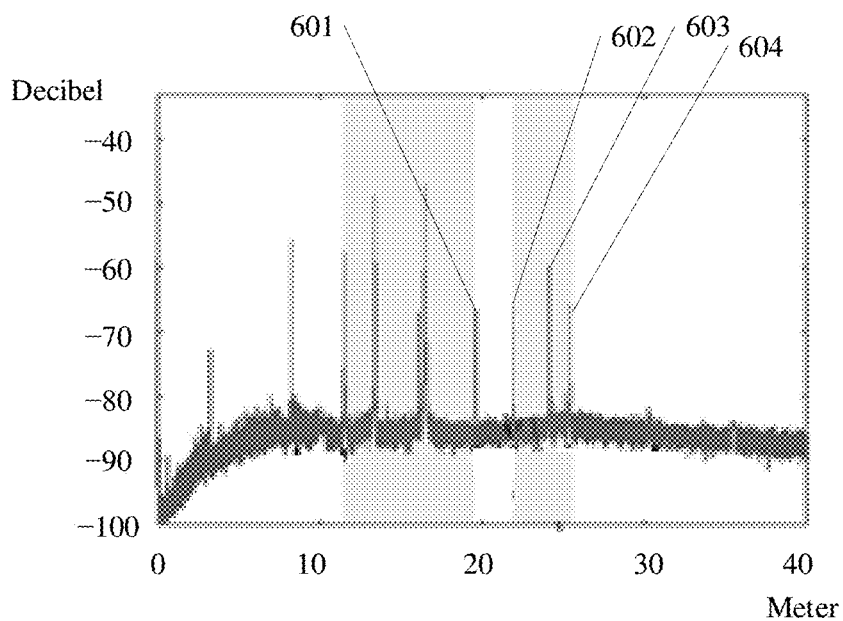
FIG. 6 is an example diagram of a third embodiment of a reflection spectrum according to this application.

FIG. 6 is an example diagram of a third embodiment of a reflection spectrum according to this application. The probe unit may determine, in the reflection spectrum, that the first reflected optical signal reflected by the second optical fiber 142 is a reflected optical signal 601.

Then, the probe unit determines, in the reflection spectrum, that the target reflected optical signal reflected by the sink optical switching apparatus 120 is a reflected optical signal that corresponds to a distance that is greater than a distance corresponding to the first reflected optical signal.

As still shown in FIG. 6, a distance corresponding to each of reflected optical signals 602, 603, and 604 in the reflection spectrum is greater than the distance corresponding to the first reflected optical signal 601. In other words, a horizontal coordinate corresponding to each of the reflected optical signals 602, 603, and 604 in the reflection spectrum is greater than a horizontal coordinate corresponding to the first reflected optical signal 601. It may be learned that target reflected optical signals reflected by the sink optical switching apparatus 120 are the reflected optical signals 602, 603, and 604.

Step 205: The network device determines, based on the target reflected optical signal, whether any optical switching apparatus included on the target path is faulty, and performs step 206 if the any optical switching apparatus included on the target path is faulty, or performs step 201 again if no optical switching apparatus included on the target path is faulty.

In this embodiment, example description is provided by using an example in which the processor determines whether the optical switching apparatus is faulty. In another example, the probe unit may determine whether the optical switching apparatus is faulty. This is not specifically limited in this embodiment. Several optional manners in which the processor determines whether the optical switching apparatus is faulty are described below.

Manner 1

In this manner, description is provided by using an example in which fault detection is performed on the sink optical switching apparatus 120 and the sink optical switching apparatus 120 included on the to-be-detected target path. Specifically, description is provided by using an example in which fault detection is performed on the sink optical switching apparatus 120.

The network device may send the probe optical signal to the target path for A consecutive times, so that the network device can obtain A reflection spectra. It may be learned that in the A reflection spectra, different reflection spectra are generated based on different probe optical signals.

One of the A reflection spectra is shown in FIG. 5. For description of a specific process of how the network device specifically obtains the reflection spectrum shown in FIG. 5, refer to step 204. For a process of obtaining another reflection spectrum, refer to the process in which the network device obtains the reflection spectrum shown in FIG. 5.

The network device determines, in the A reflection spectra, whether there is a target reflected optical signal that meets a first fault condition in the target reflected optical signals reflected by the sink optical switching apparatus 120, and if there is a target reflected optical signal that meets the first fault condition, determines that the sink optical switching apparatus 120 is faulty. The first fault condition is that an absolute value of a difference between amplitudes corresponding to target reflected optical signals located at a same position in the A reflection spectra is greater than or equal to a first preset value.

For example, the network device respectively determines, in the A reflection spectra, A target reflected optical signals that are reflected by the sink optical switching apparatus 120 and that are located at a same position. Details are shown in FIG. 5. The target reflected optical signals reflected by the sink optical switching apparatus 120 are target reflected optical signals 504, 510, and 511 in the reflection spectrum. The network device determines whether each of the plurality of target reflected optical signals transmitted by the sink optical switching apparatus 120 meets the first fault condition. Example description is provided below by using an example in which the network device determines whether the target reflected optical signal 504 meets the first fault condition.

The network device first determines a value of a horizontal coordinate corresponding to the target reflected optical signal 504. As shown in FIG. 5, the value of the horizontal coordinate of the target reflected optical signal 504 is 21.85, and the network device respectively determines, in the A reflection spectra, A target reflected optical signals whose horizontal coordinate value is 21.85.

The network device determines whether an absolute value of a difference between amplitudes corresponding to the A target reflected optical signals whose horizontal coordinate value is 21.85 is greater than or equal to the first preset value. If the absolute value of the difference is greater than or equal to the first preset value, it indicates that the sink optical switching apparatus 120 is faulty.

Figure 7:
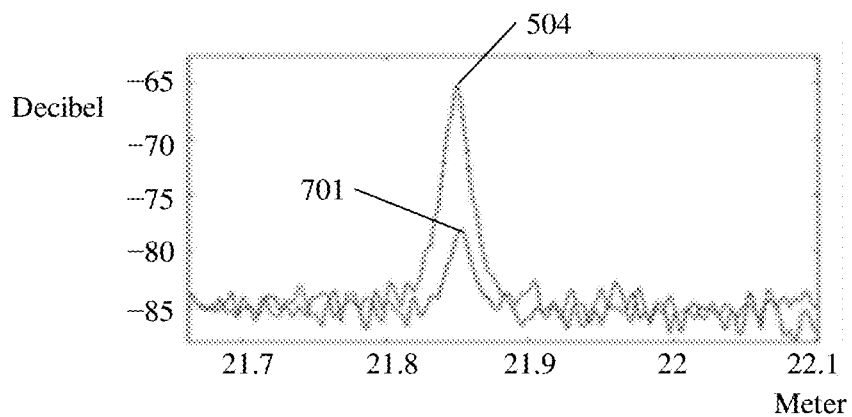
FIG. 7 is an example diagram of comparison between reflection spectra formed after different probe optical signals are reflected by a same target path according to this application.

Specifically, FIG. 7 is an example diagram of comparison between reflection spectra formed after different probe optical signals are reflected by a same target path according to this application.

In this example, example description is provided by using an example in which a value of A is 2. The network device sends a probe optical signal to the target path at a moment T1, and sends a probe optical signal to the target path again at a moment T2. The probe optical signal sent to the target path at the moment T1 is different from the probe optical signal sent to the target path at the moment T2.

As shown in FIG. 7, each reflected optical signal formed after the probe optical signal sent at the moment T1 is reflected by the target path and each reflected optical signal formed after the probe optical signal sent at the moment T2 is reflected by the target path are superimposed in a same coordinate system. For description of the coordinate system shown in FIG. 7, refer to FIG. 3.

As shown in FIG. 7, the two target reflected optical signals whose horizontal coordinate value is 21.85 are the target reflected optical signal 504 and a target reflected optical signal 701. The target reflected optical signal 504 and the target reflected optical signal 701 are generated after reflection is performed at a same position (namely, the input port in the sink optical switching apparatus 120) in the sink optical switching apparatus 120 based on different probe optical signals.

Values of two amplitudes respectively corresponding to the target reflected optical signal 504 and the target reflected optical signal 701 in the reflection spectrum are respectively −65 dB and −81 dB. An absolute value of a difference between the amplitudes corresponding to the two target reflected optical signals located at the same position is equal to |−65+81|=16 dB. In this embodiment, an example in which the first preset value is equal to 10 dB is used. It may be learned that the two target reflected optical signals whose horizontal coordinate value is 21.85 meet the first fault condition, and the network device determines that the sink optical switching apparatus 120 is faulty.

Optionally, if the absolute value of the difference between the amplitudes corresponding to the two target reflected optical signals located at the same position is less than the first preset value, the network device detects whether all other target reflected optical signals reflected by the sink optical switching apparatus 120 meet the first fault condition.

In conclusion, if none of the target reflected optical signals reflected by the sink optical switching apparatus 120 meets the first fault condition, it indicates that the sink optical switching apparatus 120 is not faulty. If one or more target reflected optical signals reflected by the sink optical switching apparatus 120 meet the first fault condition, it indicates that the sink optical switching apparatus 120 is faulty.

Manner 2

In the manner 1, description is provided by using an example in which the A reflection spectra are obtained to determine whether the optical switching apparatus is faulty. In this manner, description is provided by using an example in which only one reflection spectrum is required to determine whether the optical switching apparatus is faulty.

Specifically, in this manner, fault detection continues to be performed on the target path shown above, and example description is provided by using an example in which it is detected whether the sink optical switching apparatus 120 is faulty.

As shown in FIG. 5, the network device determines whether there is a target reflected optical signal that meets a second fault condition in the plurality of target reflected optical signals (namely, target reflected optical signals 504, 510, and 511) reflected by the sink optical switching apparatus 120, and if there is a target reflected optical signal that meets the second condition, it indicates that the sink optical switching apparatus 120 is faulty.

The second fault condition is that in the reflection spectrum, there are one or more target reflected optical signals that correspond to amplitudes that are greater than or equal to a second preset value in the plurality of target reflected optical signals reflected by the sink optical switching apparatus 120.

Figure 8:
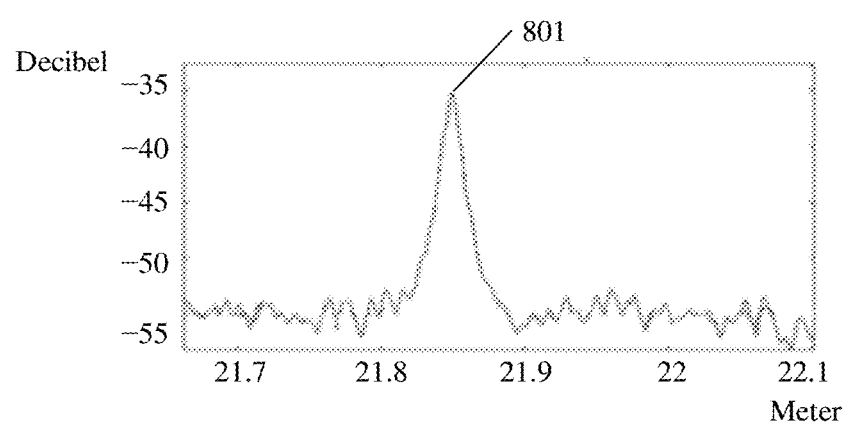
FIG. 8 is an example diagram of a fourth embodiment of a reflection spectrum according to this application.

Specifically, FIG. 8 is an example diagram of a fourth embodiment of a reflection spectrum according to this application. An amplitude corresponding to a target reflected optical signal 801 reflected by the sink optical switching apparatus 120 is equal to −35 dB. For detailed description of the target reflected optical signal 801 shown in FIG. 8, refer to the foregoing description. If the second preset value shown in this embodiment is −40 dB, it indicates that the amplitude (−35 dB) corresponding to the target reflected optical signal 801 is greater than the second preset value −40 dB, and the network device may determine that the sink optical switching apparatus 120 is faulty.

It may be learned that if the network device determines that one or more target reflected optical signals reflected by the sink optical switching apparatus 120 meet the second fault condition, it is determined that the sink optical switching apparatus 120 is faulty. If the network device determines that any target reflected optical signal reflected by the sink optical switching apparatus 120 does not meet the second fault condition, it is determined that the sink optical switching apparatus 120 is not faulty.

Manner 3

In the manner 1 and the manner 2, the network device may determine whether the entire sink optical switching apparatus is faulty. However, in the manner 3, the network device can specifically determine a specific position, in the sink optical switching apparatus, at which a fault occurs. Description is provided below by still using the sink optical switching apparatus 120 as an example. A specific determining process is as follows:

If the network device determines that a position, in the reflection spectrum, of the target reflected optical signal that meets the first fault condition or the second fault condition corresponds to the input port in the sink optical switching apparatus 120, it is determined that the input port in the sink optical switching apparatus 120 is faulty.

As shown in FIG. 5, in the plurality of target reflected optical signals (target reflected optical signals 504, 510, and 511) reflected by the sink optical switching apparatus, a target reflected optical signal with a smallest horizontal coordinate value is a target reflected optical signal reflected by the input port in the sink optical switching apparatus. In other words, the target reflected optical signal 504 shown in FIG. 5 is the target reflected optical signal reflected by the input port in the sink optical switching apparatus 120. If the target reflected optical signal 504 meets the first fault condition or the second fault condition shown above, it indicates that the input port in the sink optical switching apparatus 120 is faulty.

If the network device determines that the position, in the reflection spectrum, of the target reflected optical signal that meets the first fault condition or the second fault condition corresponds to the output port in the sink optical switching apparatus 120, it is determined that the output port in the sink optical switching apparatus 120 is faulty.

As shown in FIG. 5, in the plurality of target reflected optical signals (target reflected optical signals 504, 510, and 511) reflected by the sink optical switching apparatus 120, a target reflected optical signal with a largest horizontal coordinate value is a target reflected optical signal reflected by the output port in the sink optical switching apparatus. In other words, the target reflected optical signal 511 shown in FIG. 5 is the target reflected optical signal reflected by the output port in the sink optical switching apparatus 120. If the target reflected optical signal 511 meets the first fault condition or the second fault condition shown above, it indicates that the output port in the sink optical switching apparatus 120 is faulty.

If the network device determines that the position, in the reflection spectrum, of the target reflected optical signal that meets the first fault condition or the second fault condition is located between a position corresponding to the input port and a position corresponding to the output port in the sink optical switching apparatus 120, it is determined that an inside of the sink optical switching apparatus 120 is faulty.

As shown in FIG. 5, in the plurality of target reflected optical signals (target reflected optical signals 504, 510, and 511) reflected by the sink optical switching apparatus 120, the target reflected optical signal 504 is the reflected optical signal transmitted by the input port in the sink optical switching apparatus 120, and the target reflected optical signal 511 is the reflected optical signal reflected by the output port in the sink optical switching apparatus 120. The network device may determine that the target reflected optical signal 510 located between the target reflected optical signal 504 and the target reflected optical signal 511 is a reflected optical signal reflected by the inside of the sink optical switching apparatus 120. If the target reflected optical signal 510 meets the first fault condition or the second fault condition, it indicates that the inside of the sink optical switching apparatus 120 is faulty.

For a process in which the network device determines whether the source optical switching apparatus included on the target path is faulty, refer to the specific process in which the network device determines whether the sink optical switching apparatus included on the target path is faulty. This is not specifically limited in this embodiment.

When the network device determines that one or more optical switching apparatuses included on the target path are faulty, step 206 is performed. If the network device determines that none of the optical switching apparatuses included on the target path is faulty, step 201 is performed again, to periodically perform fault detection on the target path.

Step 206: The network device generates fault prompt information.

In this step, example description is provided by using an example in which an execution body is the processor included in the network device. In another example, the execution body may be the probe unit. This is not specifically limited in this embodiment.

The fault prompt information generated by the network device shown in this embodiment is used to indicate a specific faulty optical switching apparatus. Optionally, the network device may directly display the fault prompt information, so that maintenance personnel determine, based on the fault prompt information, a specific faulty optical switching apparatus included in the network device.

Alternatively, the network device may send the generated fault prompt information to a network management device connected to a plurality of network devices, and the network management device may determine, based on the fault prompt information, a specific faulty optical switching apparatus included in a specific network device.

Alternatively, if the specific position at which a fault occurs can be determined in step 205, the fault prompt information may further include fault position prompt information. For example, if the network device determines that the input port in the sink optical switching apparatus 120 is faulty, the fault prompt information includes an identifier of the sink optical switching apparatus 120 and fault position prompt information used to indicate that the input port is faulty.

Optionally, in step 204, if the network device cannot determine, in the reflection spectrum, a position of the optical fiber connected to the optical switching apparatus, a position of the to-be-detected optical switching apparatus cannot be determined in the reflection spectrum. The fault prompt information shown in this step may alternatively be used to indicate an event indicating that the optical fiber cannot be located in the reflection spectrum, to facilitate check by the maintenance personnel.

For example, if the network device performs fault detection on the source optical switching apparatus 110, but the network device cannot determine a specific position of the first optical fiber 301 and/or a specific position of the second optical fiber 142 in the reflection spectrum, the fault prompt information shown in this step is used to indicate an event indicating that the optical fiber connected to the source optical switching apparatus 110 cannot be located.

In the method shown in this embodiment, there is no need to manually check whether the optical switching apparatus is faulty, and the network device may detect, by sending the probe optical signal to the target path, whether all the optical switching apparatuses included on the target path are faulty. Therefore, efficiency and accuracy of performing fault detection on the optical switching apparatus are improved.

In addition, the network device does not need to calibrate a position of each optical switching apparatus in advance. Even if a large quantity of optical switching apparatuses are integrated into the network device, whether optical switching apparatuses on paths are faulty can be detected by sending only different probe optical signals for the optical switching apparatuses located on the different paths. Therefore, the method shown in this embodiment is applicable to a network device into which a large quantity of optical switching apparatuses are integrated. In the method shown in this embodiment, in a process of detecting the optical switching apparatus, there is strong robustness, and link noise can be effectively resisted.

In addition, in the method shown in this embodiment, a specific position, in the optical switching apparatus, at which a fault occurs can be directly determined. For example, whether the input port in the optical switching apparatus is faulty, whether the output port in the optical switching apparatus is faulty, or whether the inside of the optical switching apparatus is faulty can be directly determined based on the reflection spectrum. Therefore, a specific position, in the network device, at which a fault occurs is more precisely located, and efficiency and accuracy of maintaining the optical switching apparatus are improved.

Figure 9:
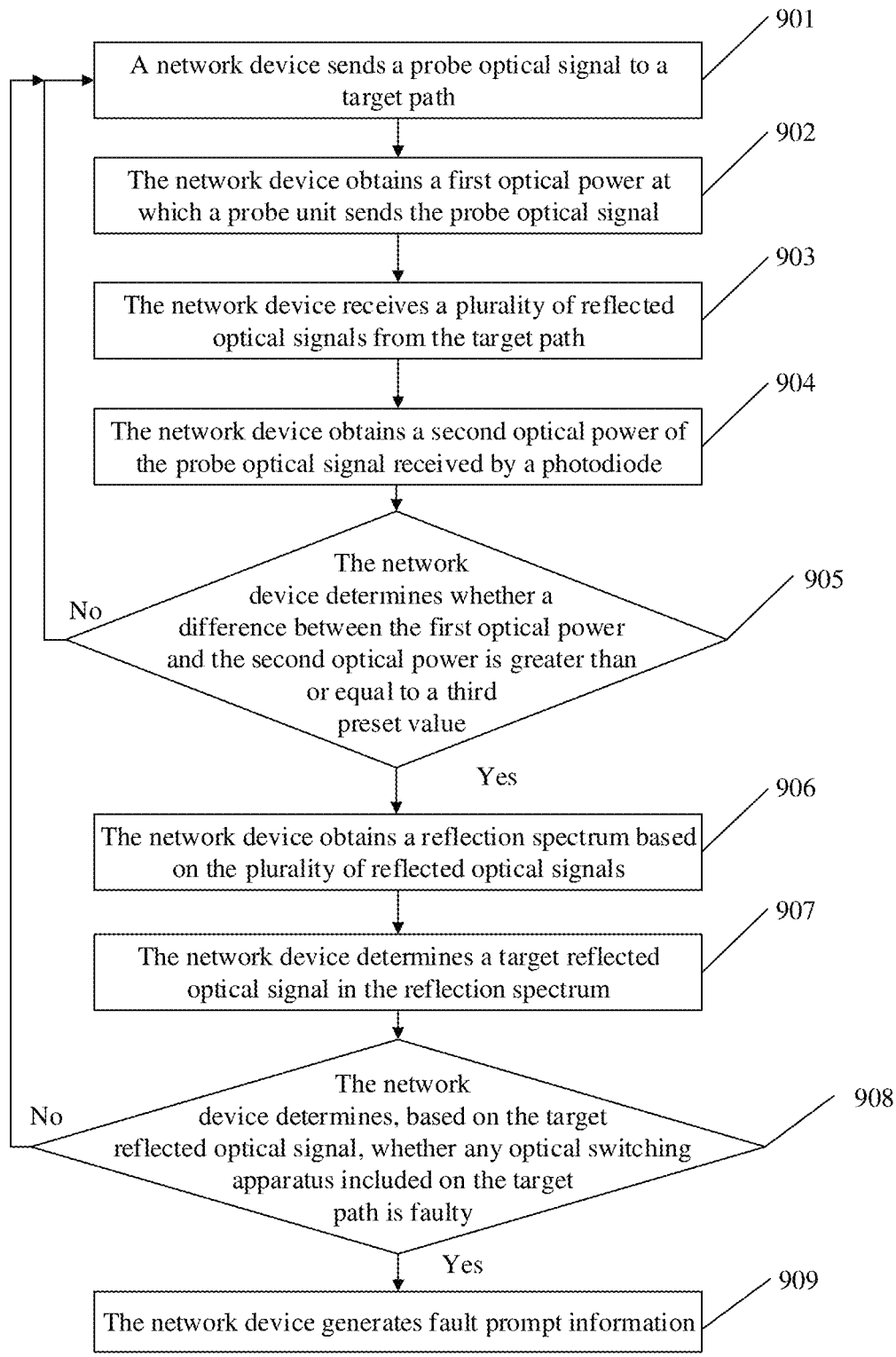
FIG. 9 is an example flowchart of steps of a second embodiment of a fault detection method according to this application.

The execution process of the fault detection method for an optical switching apparatus is described in the embodiment shown in FIG. 2. How to trigger a network device to perform fault detection on a target path is described below with reference to FIG. 9. FIG. 9 is a flowchart of steps of a second embodiment of a fault detection method according to this application.

Step 901: A network device sends a probe optical signal to a target path.

For a specific execution process of step 901 shown in this embodiment, refer to step 201 shown in FIG. 2.

Step 902: The network device obtains a first optical power at which a probe unit sends the probe optical signal.

The method shown in this embodiment is applicable to the network device shown in FIG. 4, that is, each of an input port and an output port in each optical switching apparatus included in the network device is connected to an optical fiber used to transmit the probe optical signal.

A start point of the target path on which fault detection is to be performed is the probe unit 300, and the network device obtains the first optical power at which the probe optical signal is sent from the probe unit 300.

In this embodiment, example description is provided by using an example in which an execution body of this step is the probe unit. In another example, the execution body that performs this step may alternatively be a processor. In this case, when obtaining the first optical power, the probe unit may send the first optical power to the processor.

For example, if the target path on which fault detection is to be performed includes a source optical switching apparatus 110 and a sink optical switching apparatus 120, the network device may obtain a first optical power at which the probe unit 300 sends the probe optical signal to an optical fiber 301.

Step 903: The network device receives a plurality of reflected optical signals from the target path.

For description of an execution process of step 903 shown in this embodiment, refer to step 202 shown in FIG. 2.

Step 904: The network device obtains a second optical power of the probe optical signal received by a photodiode.

As still shown in FIG. 4, the probe optical signal is sequentially transmitted to the PD 401 through the first optical fiber 301, the source optical switching apparatus 110, a second optical fiber 142, the sink optical switching apparatus 120, and a third optical fiber 402. The PD 401 may obtain the second optical power of the probe optical signal received by using the third optical fiber 402. In this embodiment, example description is provided by using an example in which an execution body of this step is the PD 401.

Step 905: The network device determines whether a difference between the first optical power and the second optical power is greater than or equal to a third preset value, and performs step 901 again if the difference between the first optical power and the second optical power is less than the third preset value, or performs step 906 if the difference between the first optical power and the second optical power is greater than or equal to the third preset value.

In this embodiment, example description is provided by using an example in which an execution body of this step is the processor. That is, the probe unit sends the obtained first optical power to the processor, and the PD sends the obtained second optical power to the processor.

The third preset value is not limited in this embodiment. In this embodiment, example description is provided by using an example in which the third preset value is 13 dB. It may be learned that if the network device determines that the difference between the first optical power and the second optical power is less than the third preset value, it indicates that each optical switching apparatus included on the target path is in a normal state and no excessively large insertion loss is caused in transmission of the probe optical signal, and step 901 may be performed again, to periodically perform fault detection on the target path.

If the network device determines that the difference between the first optical power and the second optical power is greater than or equal to the third preset value, it indicates that there is an excessively large insertion loss in a process of transmitting the probe optical signal on the target path, and further it indicates that there is a very high probability that the optical switching apparatus included on the target path is faulty. In this case, each optical switching apparatus included on the target path needs to be detected.

Step 906: The network device obtains a reflection spectrum based on the plurality of reflected optical signals.

Step 907: The network device determines a target reflected optical signal in the reflection spectrum.

Step 908: The network device determines, based on the target reflected optical signal, whether any optical switching apparatus included on the target path is faulty, and performs step 909 if the any optical switching apparatus included on the target path is faulty, or performs step 901 again if no optical switching apparatus included on the target path is faulty.

Step 909: The network device generates fault prompt information.

For a process shown in step 906 to step 909 shown in this embodiment, refer to step 203 to step 206 shown in FIG. 2.

In the method shown in this embodiment, only when the network device determines that the difference between the first optical power and the second optical power on the target path is greater than or equal to the third preset value, it indicates that an excessively large insertion loss is caused in transmission of the probe optical signal on the target path, and detection of whether each optical switching apparatus included on the target path is faulty is triggered. In this way, a disadvantage that fault detection is repeatedly performed when each optical switching apparatus included on the target path is in a normal state is avoided, and therefore efficiency of performing fault detection on the optical switching apparatus is improved.

Figure 10:
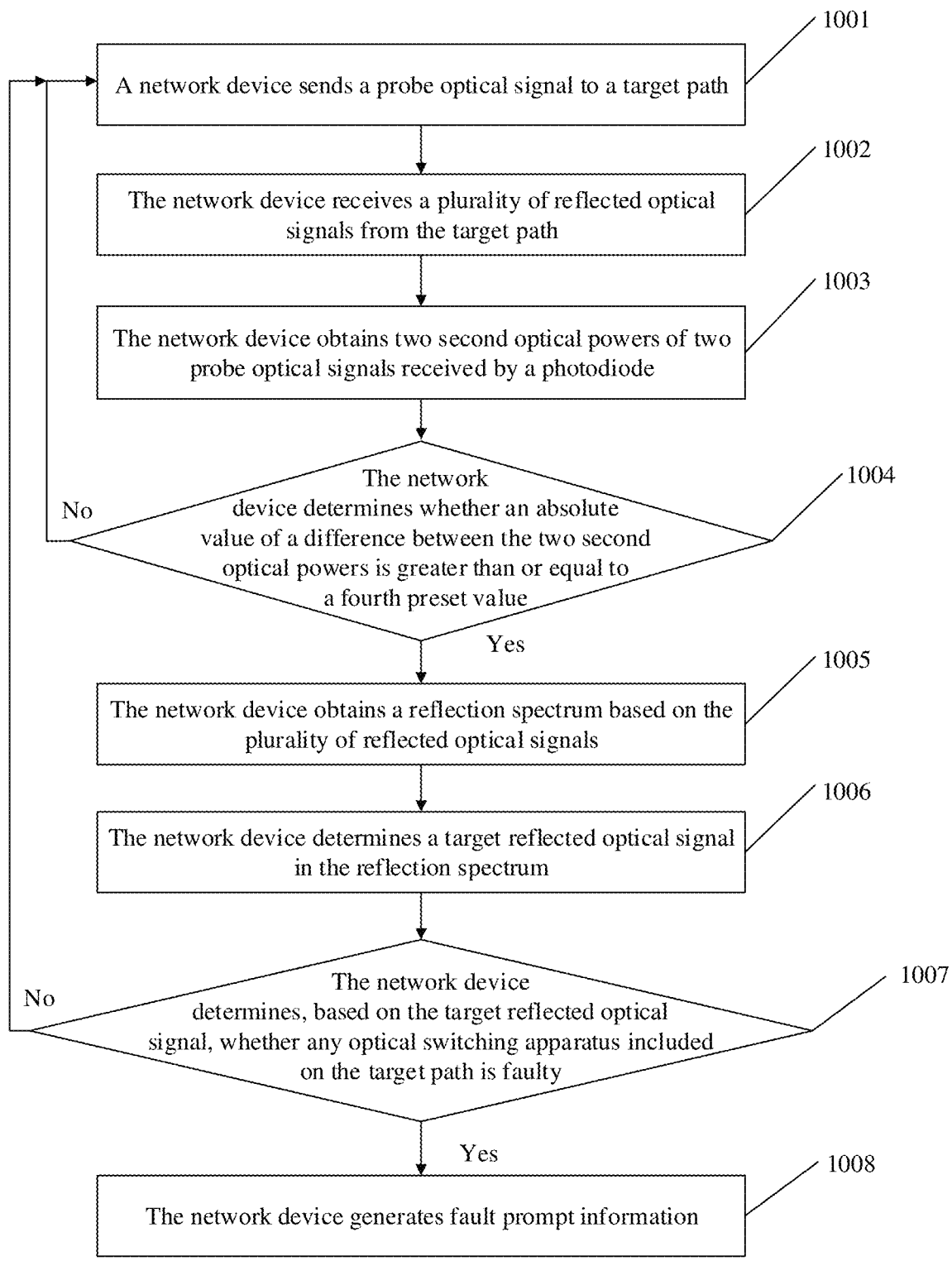
FIG. 10 is an example flowchart of steps of a third embodiment of a fault detection method according to this application.

The execution process of the fault detection method for an optical switching apparatus is described in the embodiment shown in FIG. 2. A process of how to trigger a network device to perform fault detection on a target path is described below with reference to FIG. 10. FIG. 10 is a flowchart of steps of a third embodiment of a fault detection method according to this application.

Step 1001: A network device sends a probe optical signal to a target path.

For a specific execution process of step 1001 shown in this embodiment, refer to step 901 shown in FIG. 9.

Step 1002: The network device receives a plurality of reflected optical signals from the target path.

For a specific execution process of step 1002 shown in this embodiment, refer to step 903 shown in FIG. 9.

Step 1003: The network device obtains two second optical powers of two probe optical signals received by a photodiode.

In this embodiment, a probe unit may send two different probe optical signals to a same target path. When each probe optical signal is transmitted to the PD through the target path, the PD obtains one second optical power. It may be learned that when the probe unit sends two different probe optical signals to the target path, the PD may obtain two second optical powers. For detailed description of the second optical power, refer to step 904 shown in FIG. 9.

Step 1004: The network device determines whether an absolute value of a difference between the two second optical powers is greater than or equal to a fourth preset value, and performs step 1001 again if the absolute value of the difference between the two second optical powers is less than the fourth preset value, or performs step 1005 if the absolute value of the difference between the two second optical powers is greater than or equal to the fourth preset value.

In this embodiment, description is provided by using an example in which an execution body of this step is a processor. That is, the PD sends the two obtained second optical powers to the processor.

If the network device determines that the absolute value of the difference between the two second optical powers is less than the fourth preset value, it indicates that each optical switching apparatus included on the target path is in a normal state, and step 1001 is performed again, to periodically perform fault detection on the target path. The fourth preset value is not limited in this embodiment. In this embodiment, description is provided by using an example in which the fourth preset value is 3 decibel-milliwatts (dBm).

If the network device determines that the absolute value of the difference between the two second optical powers is greater than or equal to the fourth preset value, it indicates that there is an excessively large difference between insertion losses respectively caused in transmission processes of the two probe optical signals on the target path, and it indicates that there is a very high probability that the optical switching apparatus included on the target path is faulty. In this case, each optical switching apparatus included on the target path needs to be detected.

Step 1005: The network device obtains a reflection spectrum based on the plurality of reflected optical signals.

Step 1006: The network device determines a target reflected optical signal in the reflection spectrum.

Step 1007: The network device determines, based on the target reflected optical signal, whether any optical switching apparatus included on the target path is faulty, and performs step 1008 if the any optical switching apparatus included on the target path is faulty, or performs step 1001 again if no optical switching apparatus included on the target path is faulty.

Step 1008: The network device generates fault prompt information.

For a specific execution process of step 1005 to step 1008 shown in this embodiment, refer to step 906 to step 909 shown in FIG. 9.

In the method shown in this embodiment, only when the network device determines that the absolute value of the difference between the two second optical powers on the target path is greater than or equal to the fourth preset value, it indicates that there is an excessively large difference between insertion losses respectively caused in transmission processes of the two probe optical signals on the target path, and detection of whether each optical switching apparatus included on the target path is faulty is triggered. In this way, a disadvantage that fault detection is repeatedly performed when each optical switching apparatus included on the target path is in a normal state is avoided, and therefore efficiency of performing fault detection on the optical switching apparatus is improved.

Figure 11:
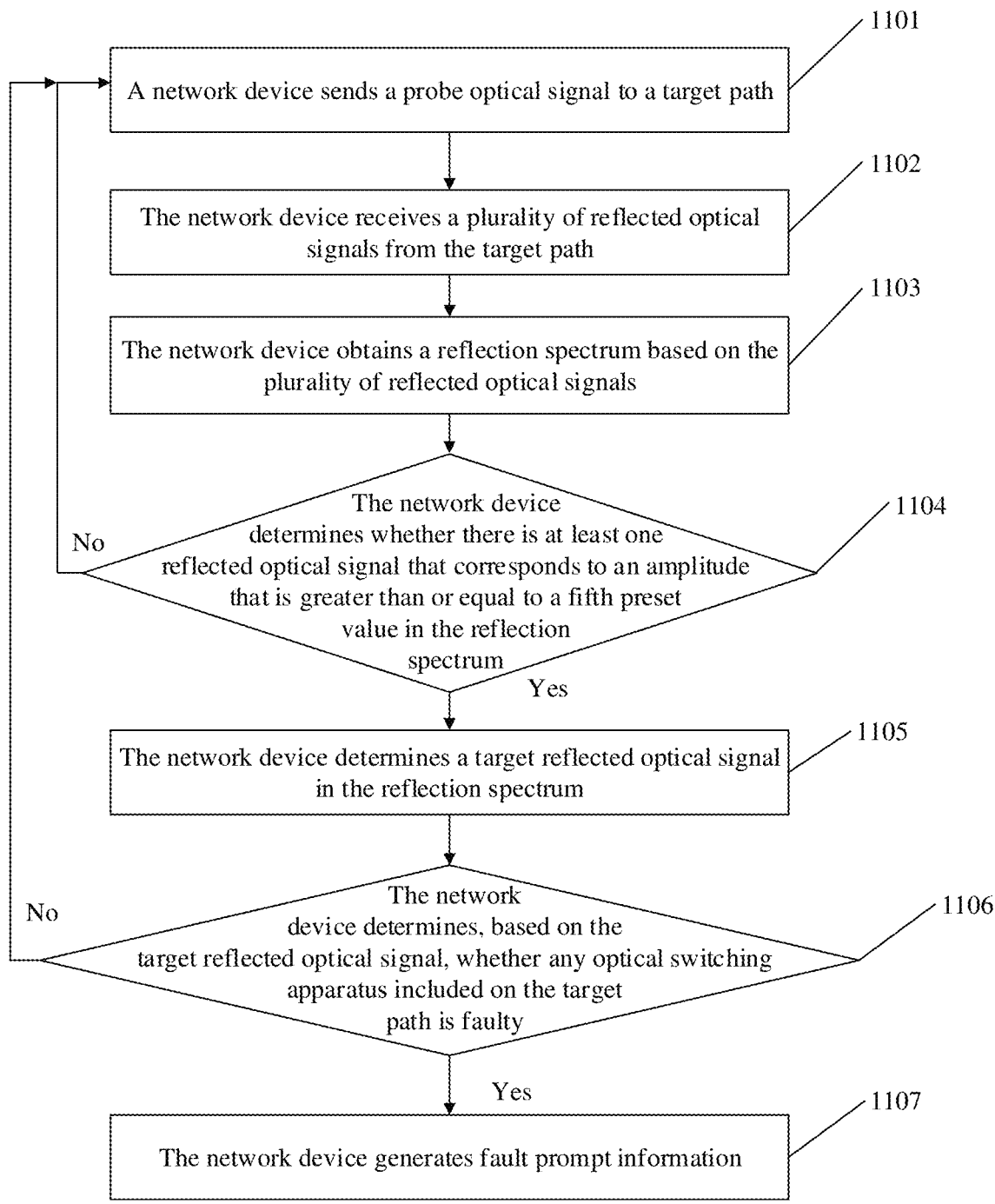
FIG. 11 is an example flowchart of steps of a fourth embodiment of a fault detection method according to this application.

The execution process of the fault detection method for an optical switching apparatus is described in the embodiment shown in FIG. 2. A process of how to trigger a network device to perform fault detection on a target path is described below with reference to FIG. 11. FIG. 11 is a flowchart of steps of a fourth embodiment of a fault detection method according to this application.

Step 1101: A network device sends a probe optical signal to a target path.

Step 1102: The network device receives a plurality of reflected optical signals from the target path.

Step 1103: The network device obtains a reflection spectrum based on the plurality of reflected optical signals.

For an execution process of step 1101 to step 1103 shown in this embodiment, refer to step 201 to step 203 shown in FIG. 2.

Step 1104: The network device determines whether there is at least one reflected optical signal that corresponds to an amplitude that is greater than or equal to a fifth preset value in the reflection spectrum, and performs step 1101 again if there is no reflected optical signal that corresponds to an amplitude that is greater than or equal to the fifth preset value, or performs step 1105 if there is at least one reflected optical signal that corresponds to an amplitude that is greater than or equal to the fifth preset value.

In this embodiment, example description is provided by using an example in which an execution body of this step is a probe unit. In another example, a processor may perform the step shown in this embodiment.

When the network device obtains the reflection spectrum, the network device may determine whether an amplitude corresponding to each of the plurality of reflected optical signals included in the reflection spectrum is greater than or equal to the fifth preset value. The fifth preset value is not specifically limited in this embodiment. For example, in this embodiment, example description is provided by using an example in which the fifth preset value is −35 dBm.

If the network device determines that there are one or more reflected optical signals that correspond to amplitudes that are greater than or equal to the fifth preset value (−35 dBm) in the plurality of reflected optical signals included in the reflection spectrum, it indicates that there is an excessively large insertion loss on the target path. Whether an optical switching apparatus included on the target path is faulty may be further determined by performing the following steps.

If the network device determines that the amplitude corresponding to each of the plurality of reflected optical signals included in the reflection spectrum is less than the fifth preset value (−35 dBm), it indicates that the target path is in a normal state, and step 1101 may be performed again, to periodically detect the target path.

Step 1105: The network device determines a target reflected optical signal in the reflection spectrum.

Step 1106: The network device determines, based on the target reflected optical signal, whether any optical switching apparatus included on the target path is faulty, and performs step 1107 if the any optical switching apparatus included on the target path is faulty, or performs step 1101 again if no optical switching apparatus included on the target path is faulty.

Step 1107: The network device generates fault prompt information.

For a specific execution process of step 1105 to step 1107 shown in this embodiment, refer to step 907 to step 909 shown in FIG. 9.

In the method shown in this embodiment, only when the network device determines that there are one or more reflected optical signals that correspond to amplitudes that are greater than or equal to the fifth preset value in the reflection spectrum on the target path, it indicates that there is an excessively large insertion loss on the target path, and detection of whether each optical switching apparatus included on the target path is faulty is triggered. In this way, a disadvantage that fault detection is repeatedly performed when each optical switching apparatus included on the target path is in a normal state is avoided, and therefore efficiency of performing fault detection on the optical switching apparatus is improved.

Figure 12:
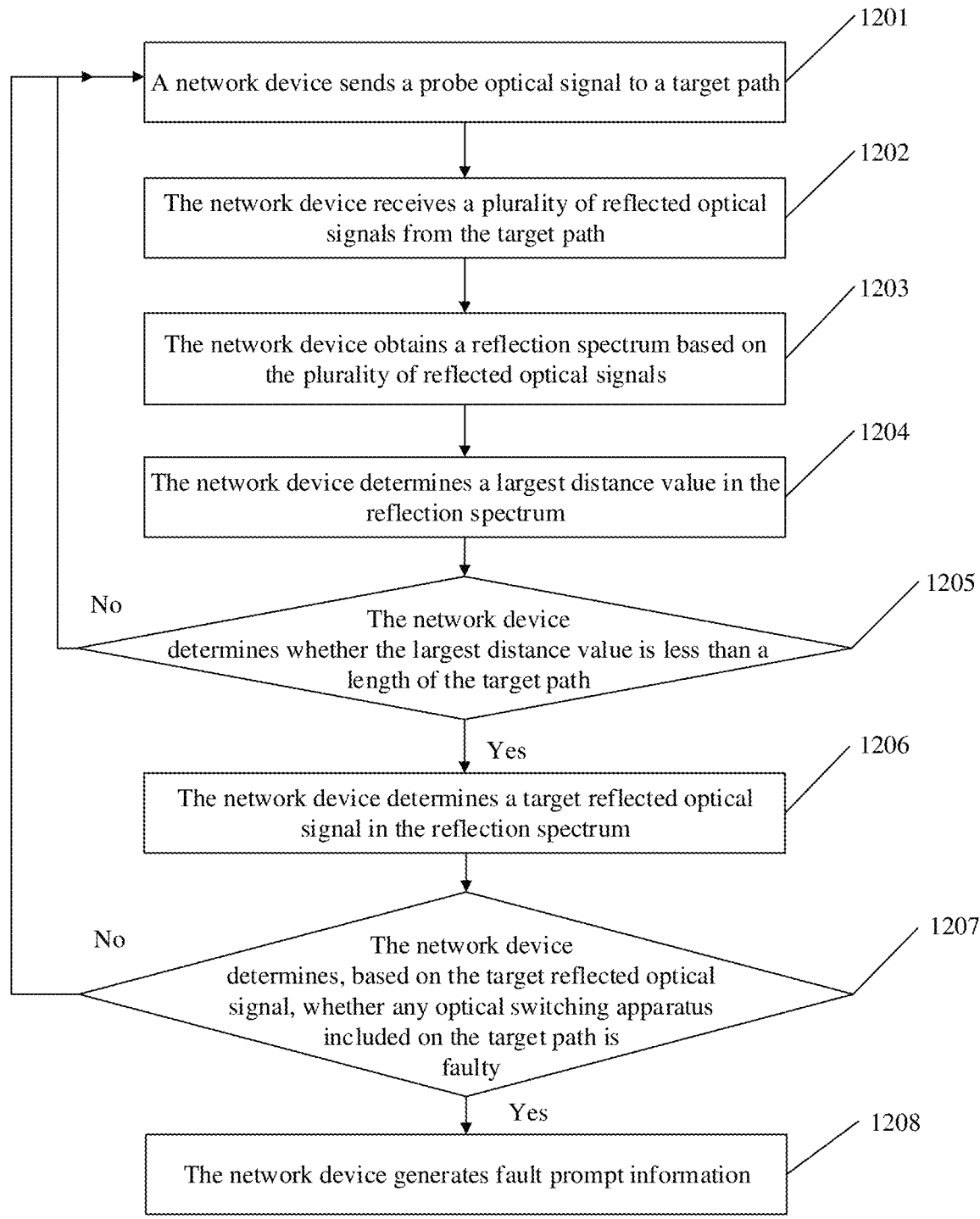
FIG. 12 is an example flowchart of steps of a fifth embodiment of a fault detection method according to this application.

The execution process of the fault detection method for an optical switching apparatus is described in the embodiment shown in FIG. 2. A process of how to trigger a network device to perform fault detection on a target path is described below with reference to FIG. 12. FIG. 12 is a flowchart of steps of a fifth embodiment of a fault detection method according to this application.

Step 1201: A network device sends a probe optical signal to a target path.

Step 1202: The network device receives a plurality of reflected optical signals from the target path.

Step 1203: The network device obtains a reflection spectrum based on the plurality of reflected optical signals.

For an execution process of step 1201 to step 1203 shown in this embodiment, refer to step 201 to step 203 shown in FIG. 2.

Step 1204: The network device determines a largest distance value in the reflection spectrum.

In this embodiment, example description is provided by using an example in which an execution body that performs this step is a probe unit. In another example, a processor may perform this step. This is not specifically limited in this embodiment.

The largest distance value is a largest value in distances between the plurality of reflected optical signals included in the reflection spectrum and the probe unit, in other words, in the plurality of reflected optical signals included in the reflection spectrum, a largest value of a horizontal coordinate is the largest distance value.

The reflection spectrum shown in FIG. 5 is used as an example. In the reflection spectrum shown in FIG. 5, the largest distance value is a value (namely, 35 m) of a horizontal coordinate corresponding to a reflected optical signal 520.

Step 1205: The network device determines whether the largest distance value is less than a length of the target path, and performs step 1201 again if the largest distance value is not less than the length of the target path, or performs step 1206 if the largest distance value is less than the length of the target path.

In this embodiment, example description is provided by using an example in which an execution body that performs this step is the probe unit. In another example, the processor may perform this step. This is not specifically limited in this embodiment.

The network device shown in this embodiment may prestore lengths of paths included in the network device. FIG. 4 is used as an example. The network device prestores a length of a target path that includes a source optical switching apparatus 110 and a sink optical switching apparatus 120.

If the network device determines that the largest distance value is less than the length of the target path, it indicates that the probe optical signal is not successfully transmitted to an end position of the target path, and further it indicates that there is a fault point (for example, a broken optical fiber or an excessively large insertion loss) on the target path, and consequently the probe optical signal cannot be successfully transmitted to the end position of the target path. Each optical switching apparatus included on the target path needs to be detected by performing subsequent steps.

FIG. 5 is still used as an example. If the largest distance value (the value 35 of the horizontal coordinate corresponding to the reflected optical signal 520) is greater than or equal to the length of the target path, it indicates that there is no fault point on the target path, and the probe optical signal can be successfully transmitted to the end position of the target path. It may be learned that in this case, the target path is in a normal state, and step 1201 may be performed again, to periodically detect the target path.

Step 1206: The network device determines a target reflected optical signal in the reflection spectrum.

Step 1207: The network device determines, based on the target reflected optical signal, whether any optical switching apparatus included on the target path is faulty, and performs step 1208 if the any optical switching apparatus included on the target path is faulty, or performs step 1201 again if no optical switching apparatus included on the target path is faulty.

Step 1208: The network device generates fault prompt information.

For a specific execution process of step 1206 to step 1208 shown in this embodiment, refer to step 907 to step 909 shown in FIG. 9.

In the method shown in this embodiment, only when the network device determines that the largest distance value in the reflection spectrum is less than the length of the target path, it indicates that the probe optical signal cannot be transmitted to the end position of the target path, and detection of whether each optical switching apparatus included on the target path is faulty is triggered. In this way, a disadvantage that fault detection is repeatedly performed when each optical switching apparatus included on the target path is in a normal state is avoided, and therefore efficiency of performing fault detection on the optical switching apparatus is improved.

Four different trigger processes used to trigger detection of each optical switching apparatus included on the target path are described in FIG. 9 to FIG. 12. In actual application, a network device may determine, by using one or more of the trigger processes in FIG. 9 to FIG. 12, whether to perform the fault detection method shown in FIG. 2 on a target path, to improve efficiency of performing fault detection on each optical switching apparatus included on the target path.

Figure 13:
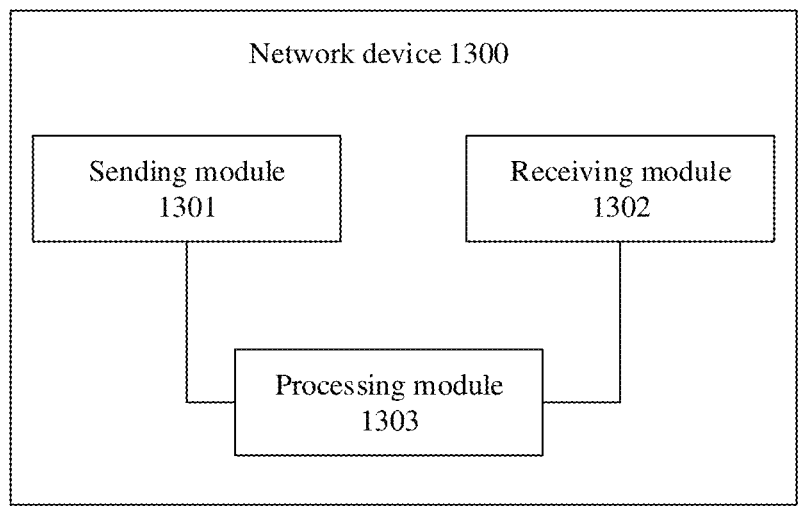
FIG. 13 is an example diagram of a structure of an embodiment of a network device according to this application.

A structure of a network device provided in this application is described below with reference to FIG. 13. FIG. 13 is an example diagram of a structure of an embodiment of a network device according to this application.

The network device 1300 shown in FIG. 13 specifically includes:

a sending module 1301, configured to send a probe optical signal to a target path, where the probe optical signal is to be transmitted along the target path, and the target path includes at least one optical switching apparatus;

a receiving module 1302, configured to receive a plurality of reflected optical signals from the target path, where the plurality of reflected optical signals are formed after the probe optical signal is reflected by the target path; and a processing module 1303, configured to determine a target reflected optical signal in the plurality of reflected optical signals, where the target reflected optical signal is a reflected optical signal reflected by the optical switching apparatus.

The processing module 1303 is further configured to determine, based on the target reflected optical signal, whether the optical switching apparatus is faulty.

If the network device 1300 is configured to perform the embodiment shown in FIG. 2, the sending module 1301 is configured to perform step 201, the receiving module is configured to perform step 202, and the processing module 1303 is configured to perform step 203 to step 203.

If the network device 1300 is configured to perform the embodiment shown in FIG. 9, the sending module 1301 is configured to perform step 901, the processing module 1303 is configured to perform step 1302, the receiving module 1302 is configured to perform step 903, and the processing module 1303 is further configured to perform step 904 to step 909.

If the network device 1300 is configured to perform the embodiment shown in FIG. 10, the sending module 1301 is configured to perform step 1001, the receiving module 1302 is configured to perform step 1002, and the processing module 1303 is configured to perform step 1003 to step 1008.

If the network device 1300 is configured to perform the embodiment shown in FIG. 11, the sending module 1301 is configured to perform step 1101, the receiving module 1302 is configured to perform step 1102, and the processing module 1303 is configured to perform step 1103 to step 1107.

If the network device 1300 is configured to perform the embodiment shown in FIG. 12, the sending module 1301 is configured to perform step 1201, the receiving module 1302 is configured to perform step 1202, and the processing module 1303 is configured to perform step 1203 to step 1208.

Figure 14:
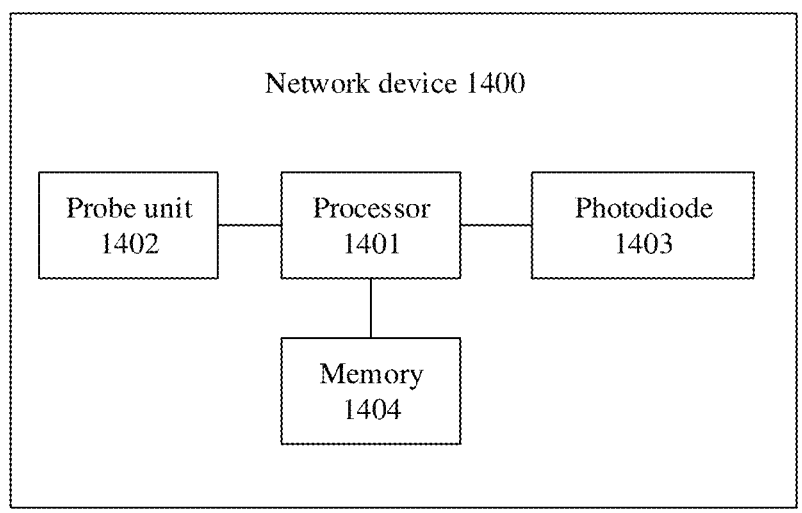
FIG. 14 is an example diagram of a hardware structure of a first embodiment of a network device according to this application.

With reference to FIG. 14, a hardware structure of a network device is described below from a perspective of physical hardware. FIG. 14 is an example diagram of a hardware structure of a first embodiment of a network device according to this application.

As shown in FIG. 14, the network device 1400 includes a processor 1401, a probe unit 1402, a photodiode 1403, and a memory 1404. The processor 1401 is connected to the probe unit 1402, the photodiode 1403, and the memory 1404.

The probe unit 1402 shown in this embodiment may be an OFDR, an OTDR, or an OCDR. For detailed description of the probe unit 1402, refer to the foregoing method embodiments.

Optionally, the processor 1401 and the memory 1404 shown in this embodiment are located on a same board, and the probe unit 1402 and the processor 1401 may be located on a same board, or may be located on different boards. The photodiode 1403 and the processor 1401 may be located on a same board, or may be located on different boards. This is not specifically limited in this embodiment.

It should be clear that the photodiode 1403 shown in this embodiment is an optional device. The network device 1400 including the photodiode 1403 is configured to perform the embodiment shown in FIG. 9 or FIG. 10.

The memory 1404 may be a nonvolatile memory such as a hard disk drive (HDD), or may be a volatile memory such as a random access memory (RAM). The memory 1404 can be configured to carry or store expected program code in an instruction or data structure form, and can be read by the processor 1401 to implement the steps performed by the processor 1401 shown in the foregoing method embodiments.

For description of specific steps performed by the probe unit 1402 and the processor 1401, refer to the foregoing method embodiments.

Figure 15:
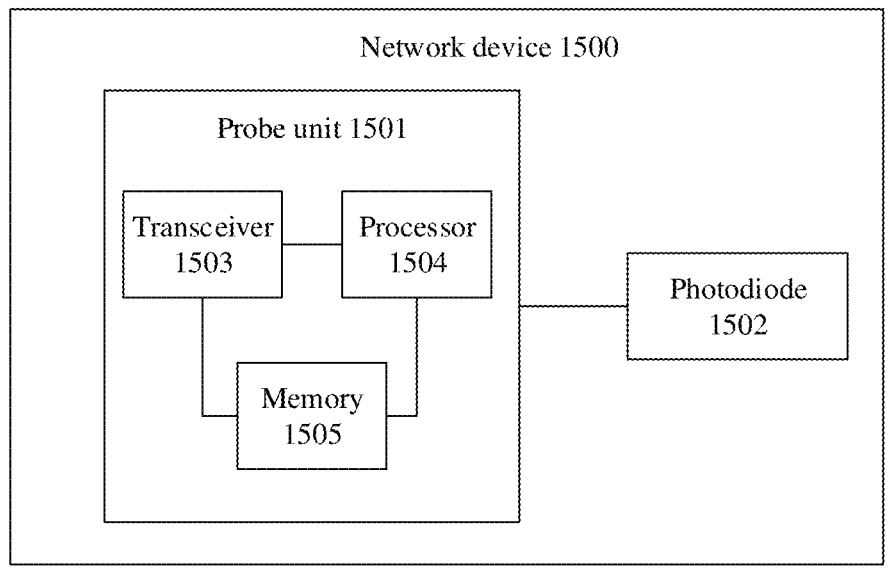
FIG. 15 is an example diagram of a hardware structure of a second embodiment of a network device according to this application.

With reference to FIG. 15, another hardware structure of a network device is described below from a perspective of physical hardware. FIG. 15 is an example diagram of a hardware structure of a second embodiment of a network device according to this application.

The network device 1500 shown in this embodiment includes a probe unit 1501 and a photodiode 1502 connected to each other. It should be clear that the photodiode 1502 shown in this embodiment is an optional device. The network device 1500 including the photodiode 1502 is configured to perform the embodiment shown in FIG. 9 or FIG. 10.

For description of a possible device form of the probe unit 1501, refer to FIG. 14. An internal structure of the probe unit 1501 is described below by using an example.

The probe unit 1501 includes a processor 1504, a memory 1505, and a transceiver 1503. The processor 1504, the memory 1505, and the transceiver 1503 are interconnected by using a line. The memory 1505 is configured to store program instructions and data.

The transceiver 1503 shown in this embodiment is configured to perform the sending/receiving steps in the foregoing method embodiments. For example, in the embodiment shown in FIG. 2, the transceiver 1503 is configured to perform step 201 and step 202, and the processor 1504 is configured to read a program and the data from the memory 1505, to perform step 203 to step 206.

For another example, in the embodiment shown in FIG. 9, the transceiver 1503 is configured to perform step 901 and step 903, and the processor 1504 is configured to perform step 902 and step 904 to step 908.

For another example, in the embodiment shown in FIG. 10, the transceiver 1503 is configured to perform step 1001 and step 1002, and the processor 1504 is configured to perform step 1003 to step 1008.

For another example, in the embodiment shown in FIG. 11, the transceiver 1503 is configured to perform step 1101 and step 1102, and the processor 1504 is configured to perform step 1103 to step 1108.

For another example, in the embodiment shown in FIG. 12, the transceiver 1503 is configured to perform step 1201 and step 1202, and the processor 1504 is configured to perform step 1203 to step 1208.

Figure 16:
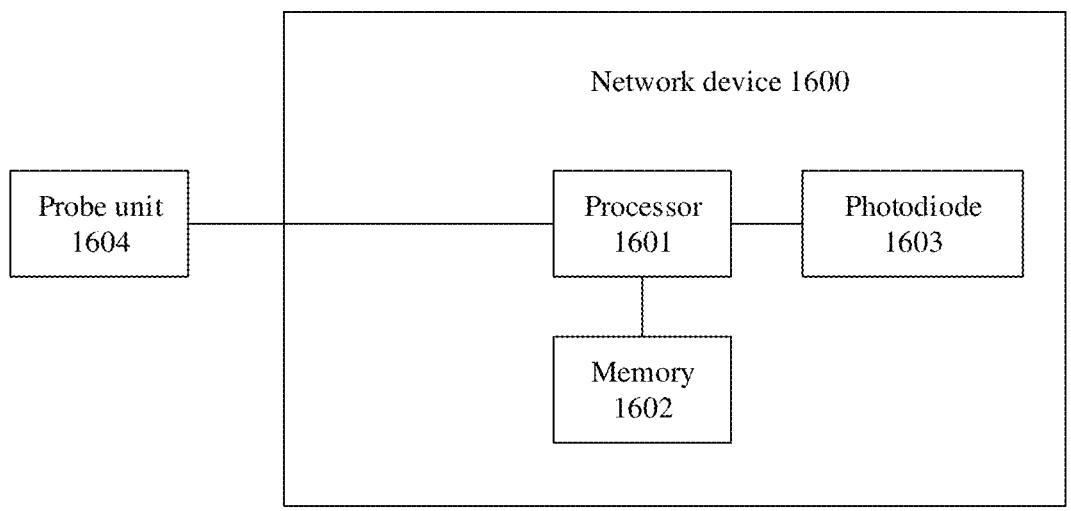
FIG. 16 is an example diagram of a hardware structure of a third embodiment of a network device according to this application.

With reference to FIG. 16, another hardware structure of a network device is described below from a perspective of physical hardware. FIG. 16 is an example diagram of a hardware structure of a third embodiment of a network device according to this application.

A probe unit 1604 shown in this embodiment is disposed outside the network device 1600, the probe unit 1604 is connected to a processor 1601 included in the network device 1600, and the probe unit 1604 is connected to a first optical fiber connected to each source optical switching apparatus included in the network device 1600. For description of a connection relationship between the probe unit and each source optical switching apparatus, refer to the foregoing method embodiments.

For description of a device form of the probe unit 1604, refer to FIG. 14. For detailed description of the processor 1601, a photodiode 1603, and a memory 1602, refer to FIG. 14.

In FIG. 14, the probe unit 1402 is located inside the network device 1400, and the processor 1401 may exchange data with the probe unit 1402 through an internal interface.

However, in FIG. 16, the probe unit 1604 is located outside the network device 1600, and the processor 1601 may exchange data with the probe unit 1604 through an external interface.

Based on the foregoing embodiments, an embodiment of this application further provides a fault detection system. The fault detection system includes a probe unit, a processor, a memory, and a plurality of optical switching apparatuses. The processor is connected to the probe unit and the memory. The probe unit is connected to a source optical switching apparatus in the plurality of optical switching apparatuses by using an optical fiber. For detailed description of the source optical switching apparatus, refer to FIG. 1. For detailed description of the probe unit, the processor, and the memory, refer to either of FIG. 14 and FIG. 16.

Optionally, the fault detection system further includes a PD, and the PD is connected to a sink optical switching apparatus and the processor. For detailed description of the sink optical switching apparatus, refer to FIG. 1. For detailed description of the PD, refer to either of FIG. 14 and FIG. 16.

Based on the foregoing embodiments, an embodiment of this application further provides a computer-readable storage medium. The storage medium stores a software program. When the software program is read and executed by a processor, the steps that are performed by the processor and that are provided in any one or more of the foregoing embodiments may be implemented.

The computer-readable storage medium may include any medium that can store program code, for example, a USB flash drive, a removable hard disk, a read-only memory, a random access memory, a magnetic disk, or an optical disc.

Based on the foregoing embodiments, an embodiment of this application further provides a chip. The chip includes a processor, configured to implement the function related to the processor in any one or more of the foregoing embodiments.

Optionally, the chip further includes a memory, and the memory is configured to store necessary program instructions and data to be executed by the processor. The chip system may include a chip, or include a chip and another discrete device.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (e.g., system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operation steps are performed on the computer or the another programmable device to generate computer-implemented processing, and instructions executed on the computer or the another programmable device provide steps for implementing a function specified in one or more procedures in the flowchart and/or one or more blocks in the block diagram.

A person skilled in the art can make various modifications and variations to embodiments of this application without departing from the spirit and scope of embodiments of this application. In this case, this application is intended to cover these modifications and variations provided that they fall within the scope of protection defined by the following claims and their equivalent technologies.

What is claimed is:

1. A fault detection method for an optical switching apparatus, the method comprising:
    sending a probe optical signal to a target path, wherein the target path includes at least one optical switching apparatus;
    receiving a plurality of reflected optical signals from the target path, wherein the plurality of reflected optical signals are formed after the probe optical signal is reflected by the target path;
    determining a target reflected optical signal in the plurality of reflected optical signals, wherein the target reflected optical signal is reflected by the at least one optical switching apparatus; and
    determining, based on the target reflected optical signal, whether the optical switching apparatus is faulty, wherein
    the target path further comprises a probe unit configured to send the probe optical signal to the target path, and
    determining the target reflected optical signal in the plurality of reflected optical signals comprises:
        obtaining a reflection spectrum that includes a correspondence between an amplitude and a distance of any one of the plurality of reflected optical signals, and the distance of the any one of the plurality of reflected optical signals indicates a distance between a reflection point on the target path configured to reflect the any one of the plurality of reflected optical signals and the probe unit, and
        determining the target reflected optical signal in the reflection spectrum, wherein determining, based on the target reflected optical signal, whether the optical switching apparatus is faulty comprises:
        obtaining a plurality of reflection spectra, wherein different reflection spectra, from the plurality of reflection spectra, are generated based on different probe optical signals;
        determining whether there is a target reflected optical signal satisfying a fault condition, wherein the fault condition includes an absolute value of a difference between amplitudes corresponding to target reflected optical signals located at a same position in the plurality of reflection spectra being greater than or equal to a first preset value; and determining that the optical switching apparatus is faulty based on the target reflected optical signal satisfying the fault condition.

2. The method according to claim 1, wherein
the at least one optical switching apparatus comprises a first optical switching apparatus having an input port connected to an input optical fiber, and an output port connected to an output optical fiber, and
determining the target reflected optical signal in the reflection spectrum comprises:
determining, in the reflection spectrum, a first reflected optical signal reflected by the input optical fiber;
determining, in the reflection spectrum, a second reflected optical signal reflected by the output optical fiber; and
determining, in the reflection spectrum, that the target reflected optical signal reflected by the first optical switching apparatus is located between the first reflected optical signal and the second reflected optical signal.

3. The method according to claim 1, wherein
the at least one optical switching apparatus comprises a second optical switching apparatus having an input port connected to an input optical fiber, and an output port,
transmission of the probe optical signal ends at the output port in the second optical switching apparatus, and
determining the target reflected optical signal in the reflection spectrum comprises:
determining, in the reflection spectrum, a first reflected optical signal reflected by the input optical fiber; and
determining, in the reflection spectrum, that a target reflected optical signal reflected by the second optical switching apparatus corresponds to a distance greater than a distance corresponding to the first reflected optical signal.

4. The method according to claim 2, wherein determining, in the reflection spectrum, the first reflected optical signal reflected by the input optical fiber comprises:
determining a length of the input optical fiber; and
determining, in the reflection spectrum, two reflected optical signals satisfying a first condition, wherein the first reflected optical signal, of the two reflected optical signals, is reflected by a first reflection point in the input optical fiber, the first reflection point is comprised in the input optical fiber and is at a shortest distance from the probe unit, and the first condition includes the two reflected optical signals being adjacent to each other in the reflection spectrum, and a distance between the two reflected optical signals corresponding to the length of the input optical fiber.

5. The method according to claim 2, wherein determining, in the reflection spectrum, the second reflected optical signal reflected by the output optical fiber comprises:
determining a length of the output optical fiber; and
determining, in the reflection spectrum, two reflected optical signals satisfying a second condition, wherein the second reflected optical signal, of the two reflected optical signals, is reflected by a second reflection point in the output optical fiber, the second reflection point is comprised in the output optical fiber and is at a longest distance from the probe unit, and the second condition includes the two reflected optical signals being adjacent to each other in the reflection spectrum, and a distance between the two reflected optical signals corresponding to the length of the output optical fiber.

6. The method according to claim 1, wherein determining, based on the target reflected optical signal, whether the optical switching apparatus is faulty comprises:
determining whether a target reflected optical signal satisfies a fault condition, wherein the fault condition includes an amplitude corresponding to the target reflected optical signal in the reflection spectrum being greater than or equal to a second preset value; and
determining that the optical switching apparatus is faulty based on the target reflected optical signal satisfying the fault condition.

7. The method according to claim 1, further comprising:
determining that the input port is faulty based on a position, in the reflection spectrum, of the target reflected optical signal satisfying the fault condition corresponding to an input port in the optical switching apparatus;
determining that the output port is faulty based on the position, in the reflection spectrum, of the target reflected optical signal satisfying the fault condition corresponding to an output port in the optical switching apparatus; and/or
determining that an inside of the optical switching apparatus is faulty based on the position, in the reflection spectrum, of the target reflected optical signal satisfying the fault condition being located between a position corresponding to the input port and a position corresponding to the output port.

8. The method according to claim 1, wherein
the target path further comprises a photodiode (PD),
the probe unit is located at a start position of the target path,
the PD is located at an end position of the target path, and
the method further comprises:
obtaining a first optical power at which the probe unit sends the probe optical signal;
obtaining a second optical power of the probe optical signal received by the PD; and
triggering execution of determining the target reflected optical signal in the plurality of reflected optical signals based on a difference between the first optical power and the second optical power being greater than or equal to a third preset value.

9. The method according to claim 8, further comprising:
obtaining two second optical powers of two different probe optical signals received by the PD; and
triggering execution of determining the target reflected optical signal in the plurality of reflected optical signals based on an absolute value of a difference between the two second optical powers being greater than or equal to a fourth preset value.

10. The method according to claim 1, further comprising:
triggering execution of determining the target reflected optical signal in the plurality of reflected optical signals based on at least one reflected optical signal that corresponds to an amplitude being greater than or equal to a fifth preset value in the reflection spectrum.

11. The method according to claim 1, further comprising:
determining a largest distance value in the reflection spectrum, wherein the largest distance value is a largest value in distances between the plurality of reflected optical signals and the probe unit; and triggering execution of determining the target reflected optical signal in the plurality of reflected optical signals based on the largest distance value being less than a length of the target path.

12. A network device, comprising:
a processor; and
a memory configured to store computer readable instructions that, when executed by the processor, cause the network device to:
send a probe optical signal to a target path, wherein the target path includes at least one optical switching apparatus;
receive a plurality of reflected optical signals from the target path, wherein the plurality of reflected optical signals are formed after the probe optical signal is reflected by the target path;
determine a target reflected optical signal in the plurality of reflected optical signals, wherein the target reflected optical signal is reflected by the at least one optical switching apparatus; and
determine, based on the target reflected optical signal, whether the optical switching apparatus is faulty, wherein the target path further comprises a probe unit, and the network device is further caused to:
obtain a reflection spectrum that includes a correspondence between an amplitude and a distance of any one of the plurality of reflected optical signals, and the distance of the any one of the plurality of reflected optical signals indicates a distance between a reflection point on the target path configured to reflect the any one of the plurality of reflected optical signals and the probe unit; and
determine the target reflected optical signal in the reflection spectrum, and wherein the network device is further caused to:
obtain a plurality of reflection spectra, wherein different reflection spectra, from the plurality of reflection spectra, are generated based on different probe optical signals;
determine whether there is a target reflected optical signal satisfying a fault condition, wherein the fault condition includes an absolute value of a difference between amplitudes corresponding to target reflected optical signals located at a same position in the plurality of reflection spectra being greater than or equal to a first preset value; and
determine that the optical switching apparatus is faulty based on the target reflected optical signal satisfying the fault condition.

13. The network device according to claim 12, wherein the at least one optical switching apparatus comprises a first optical switching apparatus having an input port connected to an input optical fiber, and an output port connected to an output optical fiber, and the network device is further caused to:
determine, in the reflection spectrum, a first reflected optical signal reflected by the input optical fiber;
determine, in the reflection spectrum, a second reflected optical signal reflected by the output optical fiber; and
determine, in the reflection spectrum, that the target reflected optical signal reflected by the first optical switching apparatus is located between the first reflected optical signal and the second reflected optical signal.

14. The network device according to claim 12, wherein the at least one optical switching apparatus comprises a second optical switching apparatus having an input port connected to an input optical fiber, and an output port, transmission of the probe optical signal ends at the output port in the second optical switching apparatus, and the network device is further configured to:
determine, in the reflection spectrum, a first reflected optical signal reflected by the input optical fiber; and
determine, in the reflection spectrum, that a target reflected optical signal reflected by the second optical switching apparatus corresponds to a distance greater than a distance corresponding to the first reflected optical signal.

15. The network device according to claim 13, wherein the network device is further caused to:
determine a length of the input optical fiber; and
determine, in the reflection spectrum, two reflected optical signals satisfying a first condition, wherein the first reflected optical signal, of the two reflected optical signals, is reflected by a first reflection point in the input optical fiber, the first reflection point is comprised in the input optical fiber and is at a shortest distance from the probe unit, and the first condition includes the two reflected optical signals being adjacent to each other in the reflection spectrum, and a distance between the two reflected optical signals corresponding to the length of the input optical fiber.

16. The network device according to claim 12, wherein the network device is further caused to:
determine that the input port is faulty based on a position, in the reflection spectrum, of the target reflected optical signal satisfying the fault condition corresponding to an input port in the optical switching apparatus;
determine that the output port is faulty based on the position, in the reflection spectrum, of the target reflected optical signal satisfying the fault condition corresponding to an output port in the optical switching apparatus; and/or
determine that an inside of the optical switching apparatus is faulty based on the position, in the reflection spectrum, of the target reflected optical signal satisfying the fault condition being located between a position corresponding to the input port and a position corresponding to the output port.

17. The network device according to claim 12, wherein the network device is further caused to:
trigger execution of determining the target reflected optical signal in the plurality of reflected optical signals based on at least one reflected optical signal that corresponds to an amplitude being greater than or equal to a fifth preset value in the reflection spectrum.

18. The network device according to claim 12, wherein the network device is further caused to:
determine a largest distance value in the reflection spectrum, wherein the largest distance value is a largest value in distances between the plurality of reflected optical signals and the probe unit; and
trigger execution of determining the target reflected optical signal in the plurality of reflected optical signals based on the largest distance value being less than a length of the target path.

19. A fault detection system, comprising:
a target path having a probe unit and at least one optical switching apparatus, wherein the probe unit is connected to the at least one optical switching apparatus by using an optical fiber, and the probe unit is configured to:
  send a probe optical signal to the target path;
  receive a plurality of reflected optical signals from the target path, wherein the plurality of reflected optical signals are formed after the probe optical signal is reflected by the target path;
  determine a target reflected optical signal in the plurality of reflected optical signals; and
  determine, based on the target reflected optical signal, whether the optical switching apparatus is faulty, wherein the probe unit is further caused to:
    obtain a reflection spectrum that includes a correspondence between an amplitude and a distance of any one of the plurality of reflected optical signals, and the distance of the any one of the plurality of reflected optical signals indicates a distance between a reflection point on the target path configured to reflect the any one of the plurality of reflected optical signals and the probe unit; and
    determine the target reflected optical signal in the reflection spectrum, and wherein the probe unit is further caused to:
    obtain a plurality of reflection spectra, wherein different reflection spectra, from the plurality of reflection spectra, are generated based on different probe optical signals;
    determine whether there is a target reflected optical signal satisfying a fault condition, wherein the fault condition includes an absolute value of a difference between amplitudes corresponding to target reflected optical signals located at a same position in the plurality of reflection spectra being greater than or equal to a first preset value; and
    determine that the optical switching apparatus is faulty based on the target reflected optical signal satisfying the fault condition.

20. The fault detection system according to claim 19, wherein
  the target path further comprises a photodiode (PD),
  the probe unit is located at a start position of the target path,
  the PD is located at an end position of the target path,
  the probe unit is further configured to obtain a first optical power at which the probe unit sends the probe optical signal,
  the PD is configured to obtain a second optical power of the probe optical signal received by the PD, and
  the probe unit is further configured to trigger execution of determining the target reflected optical signal in the plurality of reflected optical signals based on a difference between the first optical power and the second optical power being greater than or equal to a third preset value.

\* \* \* \* \*